United States Patent
Thompson et al.

(10) Patent No.: US 11,623,640 B2
(45) Date of Patent: Apr. 11, 2023

(54) METHODS AND SYSTEMS FOR ASSISTIVE ACTION OF A VEHICLE

(71) Applicant: Ford Global Technologies, LLC, Dearborn, MI (US)

(72) Inventors: Scott Thompson, Belleville, MI (US); John Rollinger, Troy, MI (US); Douglas Martin, Canton, MI (US); Vincent Martinez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 17/181,957

(22) Filed: Feb. 22, 2021

(65) Prior Publication Data

US 2022/0266829 A1   Aug. 25, 2022

(51) Int. Cl.
*B60W 30/16* (2020.01)
*B60W 50/08* (2020.01)
(Continued)

(52) U.S. Cl.
CPC ............ *B60W 30/16* (2013.01); *B60W 40/08* (2013.01); *B60W 50/06* (2013.01);
(Continued)

(58) Field of Classification Search
CPC ...... B60W 30/16; B60W 40/08; B60W 50/06; B60W 50/087; B60W 2510/244; B60W 2540/10; B60W 2554/80
(Continued)

(56) References Cited

U.S. PATENT DOCUMENTS

| 6,014,601 A | 1/2000 | Gustafson |
| 6,389,347 B1 | 5/2002 | Nozaki |

(Continued)

FOREIGN PATENT DOCUMENTS

| AU | 2012323853 A1 * | 5/2014 | ............ B60W 10/02 |
| CN | 101513874 A * | 8/2009 | ............ B60K 6/445 |

(Continued)

OTHER PUBLICATIONS

Zhao, et al., Mathematical Modeling of Driver Speed Control With Individual Differences; Aug. 2, 2013; IEEE Transactions on Systems, Man, and Cybernetics: Systems; vol. 43, Issue 5; pp. 1092-1099 (https://ieeexplore.ieee.org/document/6573359) (Year: 2013).*

(Continued)

*Primary Examiner* — Atul Trivedi
(74) *Attorney, Agent, or Firm* — Vincent Mastrogiacomo; McCoy Russell LLP

(57) ABSTRACT

Methods and systems are provided for providing assistive action to a driver of a vehicle to increase a following distance between the vehicle and a target lead vehicle. In one example, providing assistive action includes, operating the vehicle manually behind a target lead vehicle on a road, including estimating a following distance between the vehicle and the target lead vehicle, and responsive to the following distance being less than a first threshold following distance, providing an assistive action by adjusting a mapping from a driver demand to a wheel torque of the vehicle to increase a perceived resistance of the vehicle to the driver demand as the following distance decreases.

20 Claims, 12 Drawing Sheets

(51) Int. Cl.
  *B60W 40/08* (2012.01)
  *B60W 50/06* (2006.01)
(52) U.S. Cl.
  CPC ..... *B60W 50/087* (2013.01); *B60W 2510/244* (2013.01); *B60W 2540/10* (2013.01); *B60W 2554/80* (2020.02)
(58) Field of Classification Search
  USPC .......................................................... 701/96
  See application file for complete search history.

(56) References Cited

U.S. PATENT DOCUMENTS

| | | | |
|---|---|---|---|
| 8,996,294 B2 | 3/2015 | Kurata et al. | |
| 9,421,871 B2 | 8/2016 | Cao | |
| 2002/0152015 A1* | 10/2002 | Seto | B60K 31/0008 123/352 |
| 2010/0209883 A1* | 8/2010 | Chin | G09B 19/167 434/65 |
| 2010/0209884 A1* | 8/2010 | Lin | G09B 19/167 434/66 |
| 2010/0209885 A1* | 8/2010 | Chin | G09B 19/167 434/66 |
| 2010/0209886 A1* | 8/2010 | Lin | G09B 19/167 434/66 |
| 2010/0302371 A1 | 12/2010 | Abrams | |
| 2015/0025764 A1* | 1/2015 | Alexander | B60K 23/0808 701/69 |
| 2016/0039415 A1* | 2/2016 | Brockley | B60W 30/143 701/94 |
| 2018/0066753 A1* | 3/2018 | Zhao | B60L 15/2009 |
| 2018/0118193 A1* | 5/2018 | Zhao | B60K 6/387 |
| 2019/0071067 A1* | 3/2019 | Leone | F02N 11/0837 |
| 2020/0398844 A1* | 12/2020 | Ruybal | B60W 10/119 |
| 2021/0370780 A1* | 12/2021 | Cho | B60L 3/0015 |

FOREIGN PATENT DOCUMENTS

| | | | | |
|---|---|---|---|---|
| CN | 101755140 A | | 6/2010 | |
| CN | 203111033 U | | 8/2013 | |
| CN | 104718113 A | * | 6/2015 | ............. B60K 28/16 |
| EP | 3677481 A1 | * | 7/2020 | ................ B60L 7/10 |
| GB | 2526357 A | * | 11/2015 | ............ B60W 10/04 |
| GB | 2579194 A | | 6/2020 | |
| JP | 5565053 B2 | | 8/2014 | |
| WO | WO-2009127452 A1 | * | 10/2009 | ............... B60K 6/48 |
| WO | WO-2014146806 A1 | * | 9/2014 | ............ B60W 10/04 |

OTHER PUBLICATIONS

Okuyama, et al.; Model predictive control-based drive assist control in Electric vehicle—An application to inter distance control considering human model; Feb. 7, 2013; 2012 9th France-Japan & 7th Europe-Asia Congress on Mechatronics; pp. 155-160 (https://ieeexplore.ieee.org/document/6451002) (Year: 2013).*

* cited by examiner

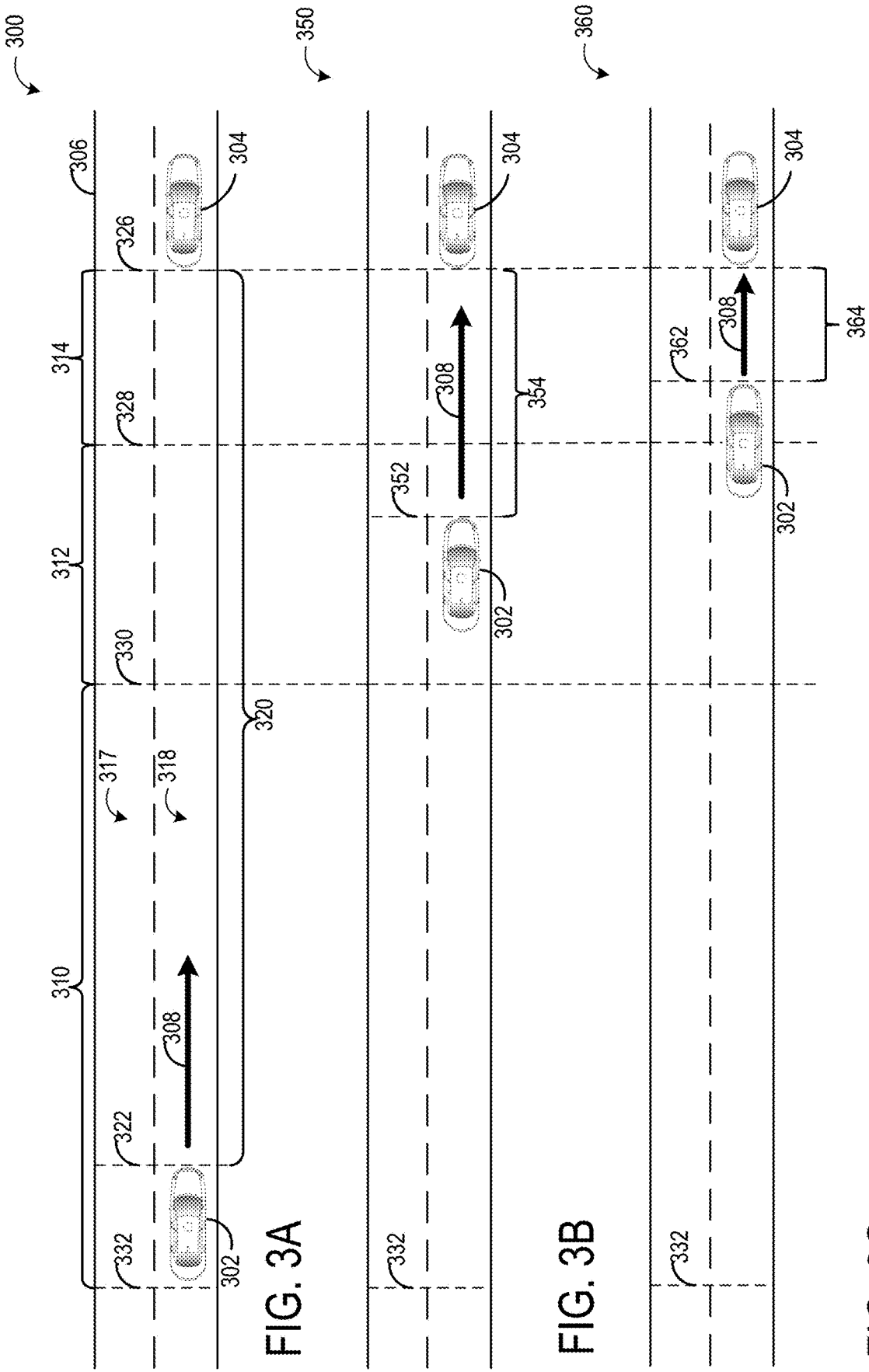

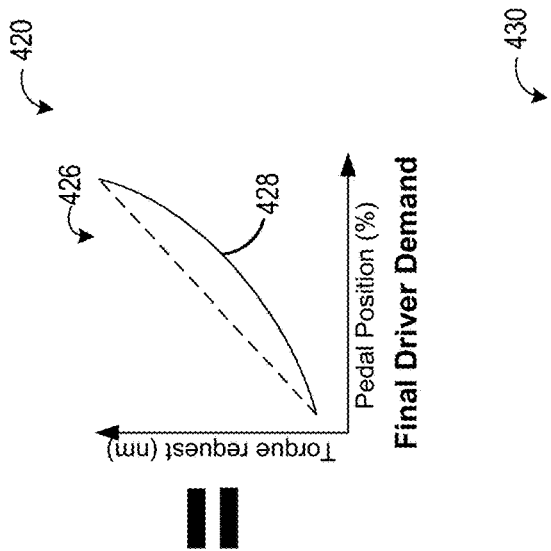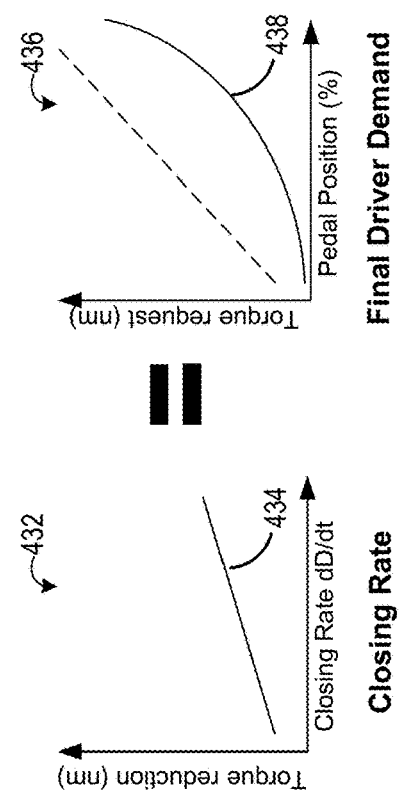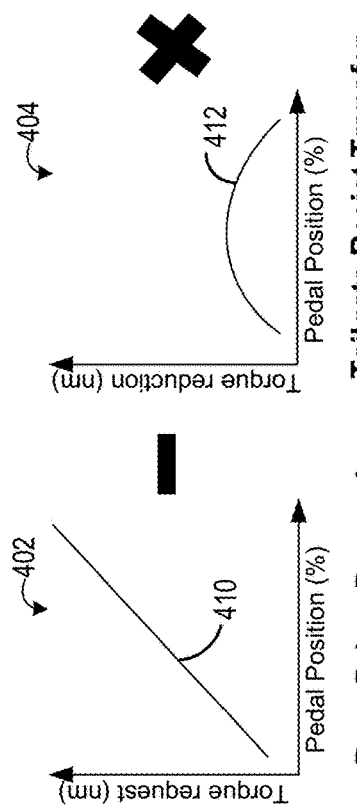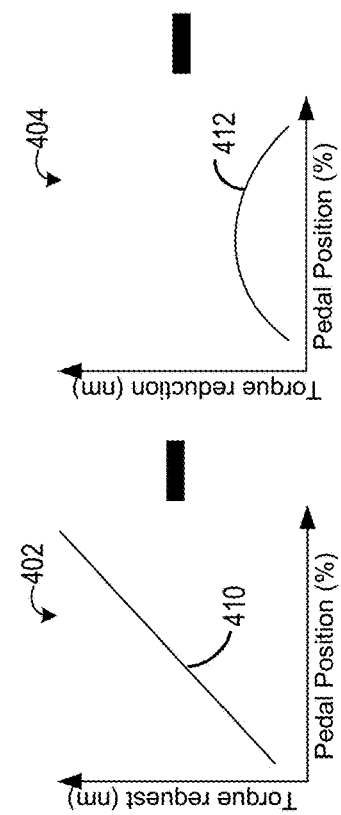
FIG. 4B
FIG. 4C

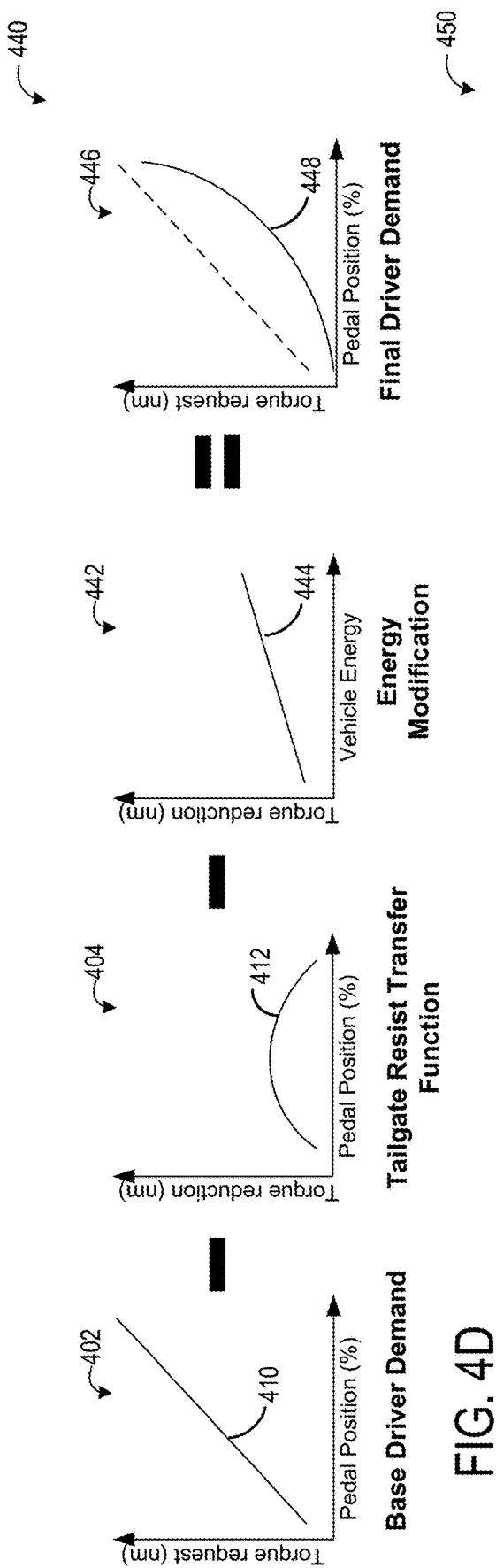
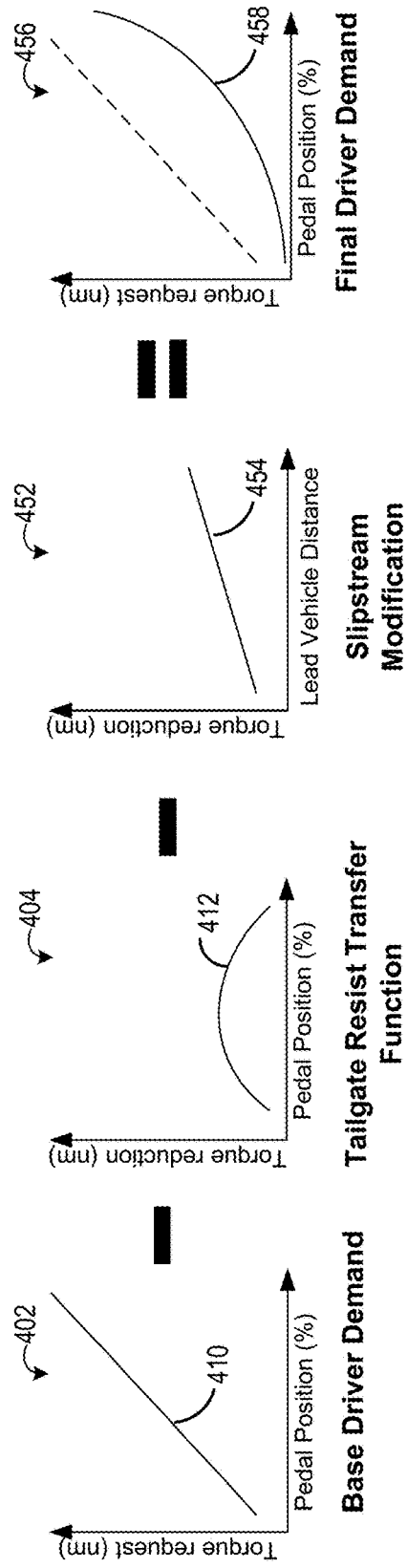
FIG. 4D
FIG. 4E

METHODS AND SYSTEMS FOR ASSISTIVE ACTION OF A VEHICLE

FIELD

The present description relates generally to methods and systems for providing assistive action to a driver of a vehicle, and more specifically, to providing assistive action to reduce a following distance of a vehicle behind a lead vehicle traveling in the same direction.

BACKGROUND/SUMMARY

When driving in traffic, variability in driving behaviors, road and climate conditions, and congestion may increase a probability of an impact between a lead vehicle and a following vehicle traveling along a road in a direction. One approach to reducing the probability of an impact is to use collision avoidance and/or collision alert applications that rely on proximity sensing systems based on sonar, vision, electromagnetic, and/or other technologies to alert an operator of a vehicle or adjust a velocity of the vehicle to avoid contact. For example, when traveling in an adaptive cruise control mode in traffic, a proximity sensing system of a vehicle may detect a moving target vehicle traveling ahead of the vehicle along a road, and estimate a following distance between the vehicle and the moving target vehicle in real time. Based on the following distance, a controller of the vehicle may adjust a velocity of the vehicle to maintain a safe following distance behind the moving target vehicle.

However, the inventors herein have recognized potential issues with current approaches to using proximity sensing systems to averting collisions. Proximity sensing systems may be used to control a vehicle in a fully automated mode, such as in cruise control or autonomous driving scenarios, but may not be used when the driver is operating the vehicle manually. In other cases, a collision alert system may warn the driver of an increased risk, but an alert may not be timely enough to reduce a probability of driver error. If alerts are issued prematurely, a driving experience of the driver may be negatively impacted, and the driver may disable the collision alert system. Under some conditions, driver safety may be improved by providing an assistive action to reduce a velocity of the vehicle, thereby increasing the following distance of the vehicle.

In one example, at least some of the issues described above may be addressed by a method for a controller of a vehicle, comprising, operating the vehicle manually behind a target lead vehicle on a road, including estimating a following distance between the vehicle and the target lead vehicle, and responsive to the following distance being less than a first threshold following distance, providing an assistive action by adjusting a mapping from a driver demand to a wheel torque of the vehicle to increase a perceived resistance of the vehicle to the driver demand as the following distance decreases. In this way, a desired acceleration of the driver may be adjusted down to increase the following distance, thereby reducing a probability of an impact with the target lead vehicle. Additionally, if more aggressive assistive action is warranted, a second driver demand adjustment may be applied to further reduce the final driver demand for torque, for example, if the following distance decreases below a second, lesser threshold following distance. The first and second threshold following distances may be calculated based on the following distance and the velocity of the vehicle, and may additionally include factors such as road and weather conditions, and/or driver experience and behaviors.

For example, the driver may wish to pass the target lead vehicle, and may accelerate the vehicle towards the target lead vehicle. If the following distance is greater than the first threshold following distance, a desired acceleration of the driver may not be adjusted via an assistive action. If the following distance is less than the first threshold following distance, the desired acceleration of the driver may be adjusted via a first assistive action. If the following distance is less than the first threshold following distance and the second threshold following distance (e.g., the vehicle is tailgating), the desired acceleration of the driver may be further adjusted down via a second assistive action. The desired acceleration of the driver may be modified as a function of vehicle speed, following distance and/or other factors, to generate a perception of an increased resistance of the vehicle to the driver demand for torque. By adjusting the driver demand for torque in response to the following distance of the vehicle being less than the first and/or second threshold following distances, the following distance of the vehicle may be increased, thereby reducing a probability of the vehicle coming into contact with the target lead vehicle. An additional advantage of the method is that the first and second threshold following distances may be modified based on additional relevant factors such as road conditions, weather conditions, driver experience, and/or driver behavior. The adjustment to the driver demand for torque may also be modified based on additional relevant factors, such as a transition factor, a rate at which the following distance is decreasing (e.g., a closing rate), an amount of kinetic energy of the vehicle, and/or a resistance of an air flow around the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a lead vehicle and a following vehicle on a road, separated by a following distance in a first following distance range.

FIG. 3B shows a lead vehicle and a following vehicle on a road, separated by a following distance in a second following distance range.

FIG. 3C shows a lead vehicle and a following vehicle on a road, separated by a following distance in a third following distance range.

FIG. 4B is a series of graphs showing how a transition factor may be applied to a tailgate resist transfer function.

FIG. 4C is a series of graphs showing how a closing rate modification may be applied to a tailgate resist transfer function.

FIG. 4D is a series of graphs showing how an energy modification may be applied to a tailgate resist transfer function.

FIG. 4E is a series of graphs showing how a slipstream modification may be applied to a tailgate resist transfer function.

DETAILED DESCRIPTION

Figure 1:
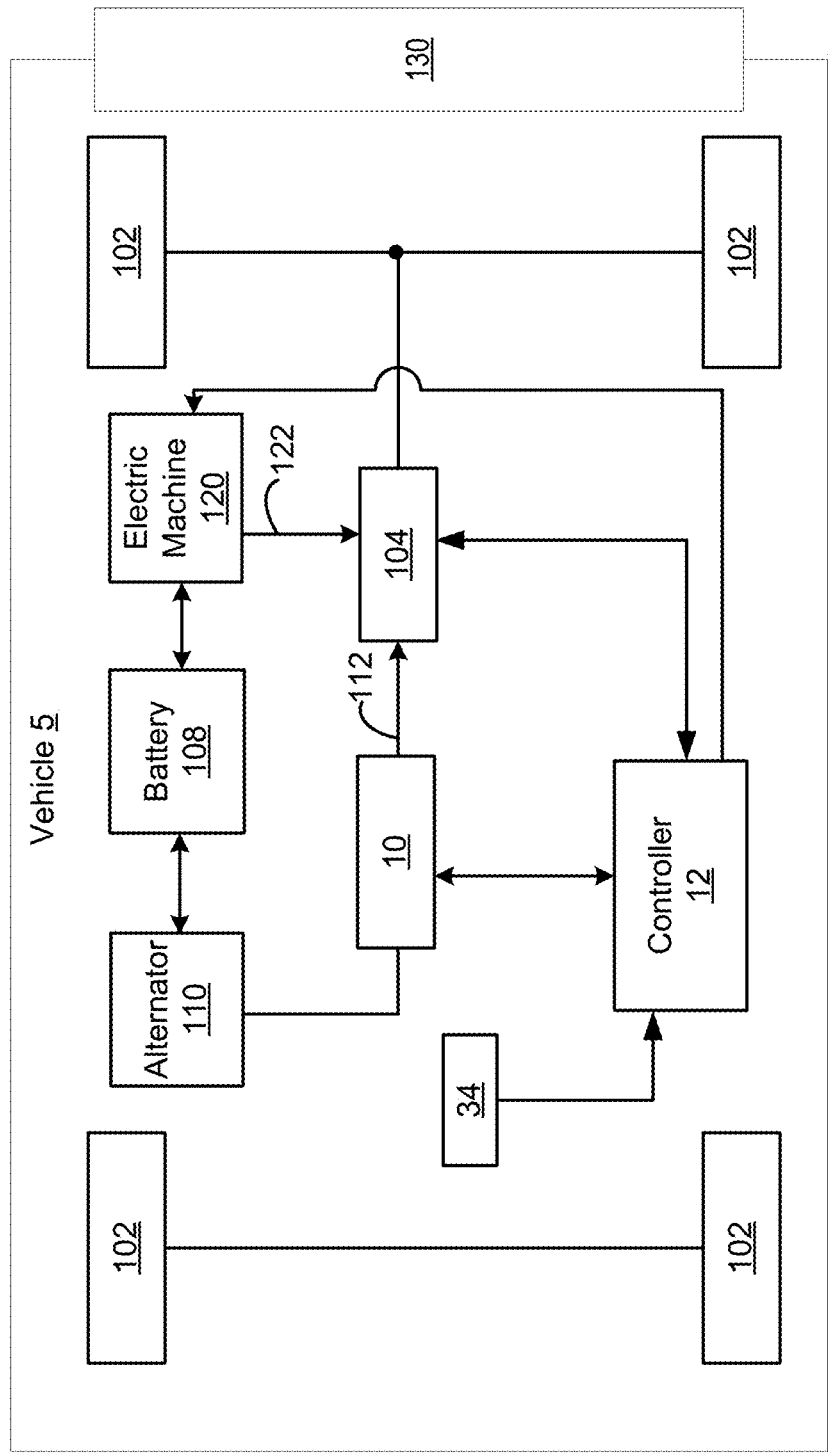
FIG. 1 shows a schematic depiction of a vehicle system.
Figure 2:
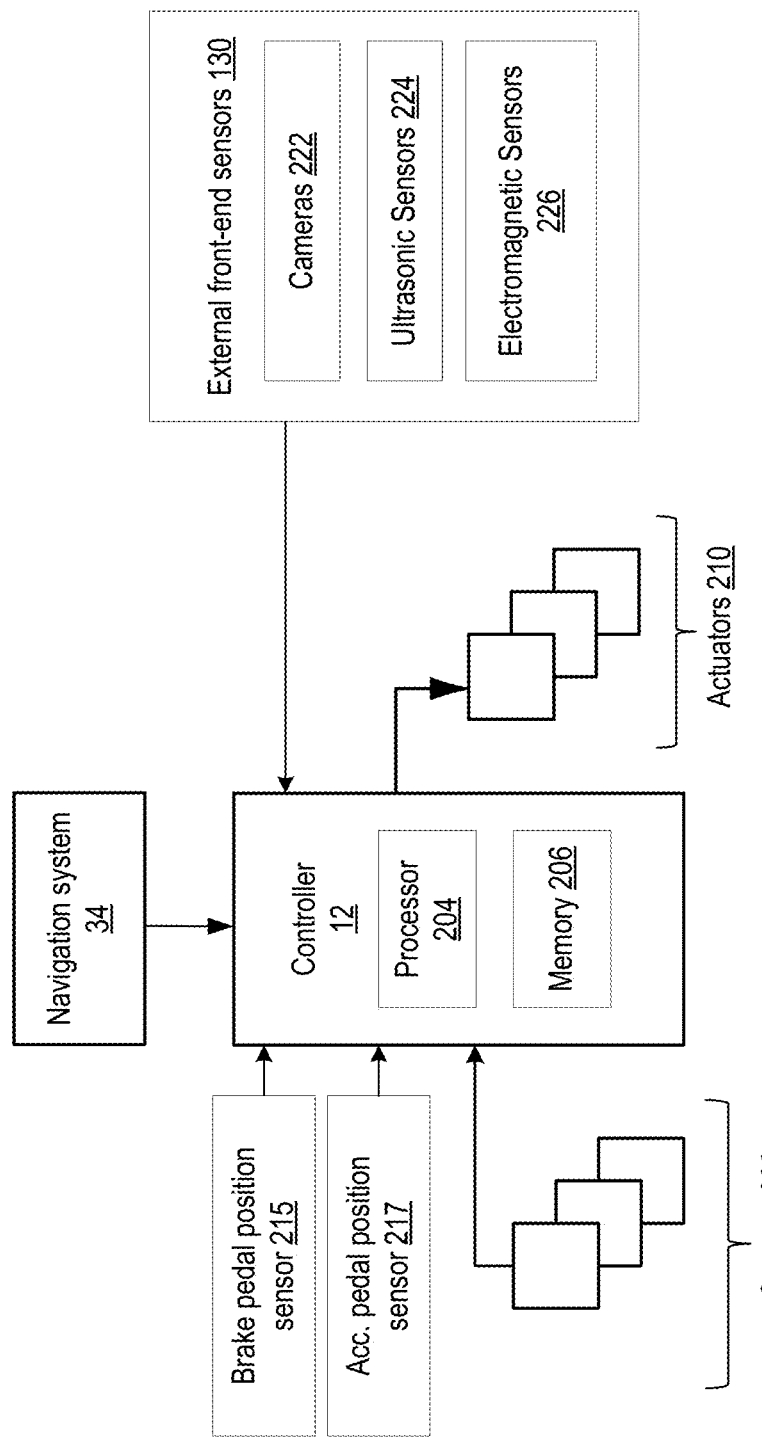
FIG. 2 shows an example embodiment of a vehicle control system.
Figure 4A:
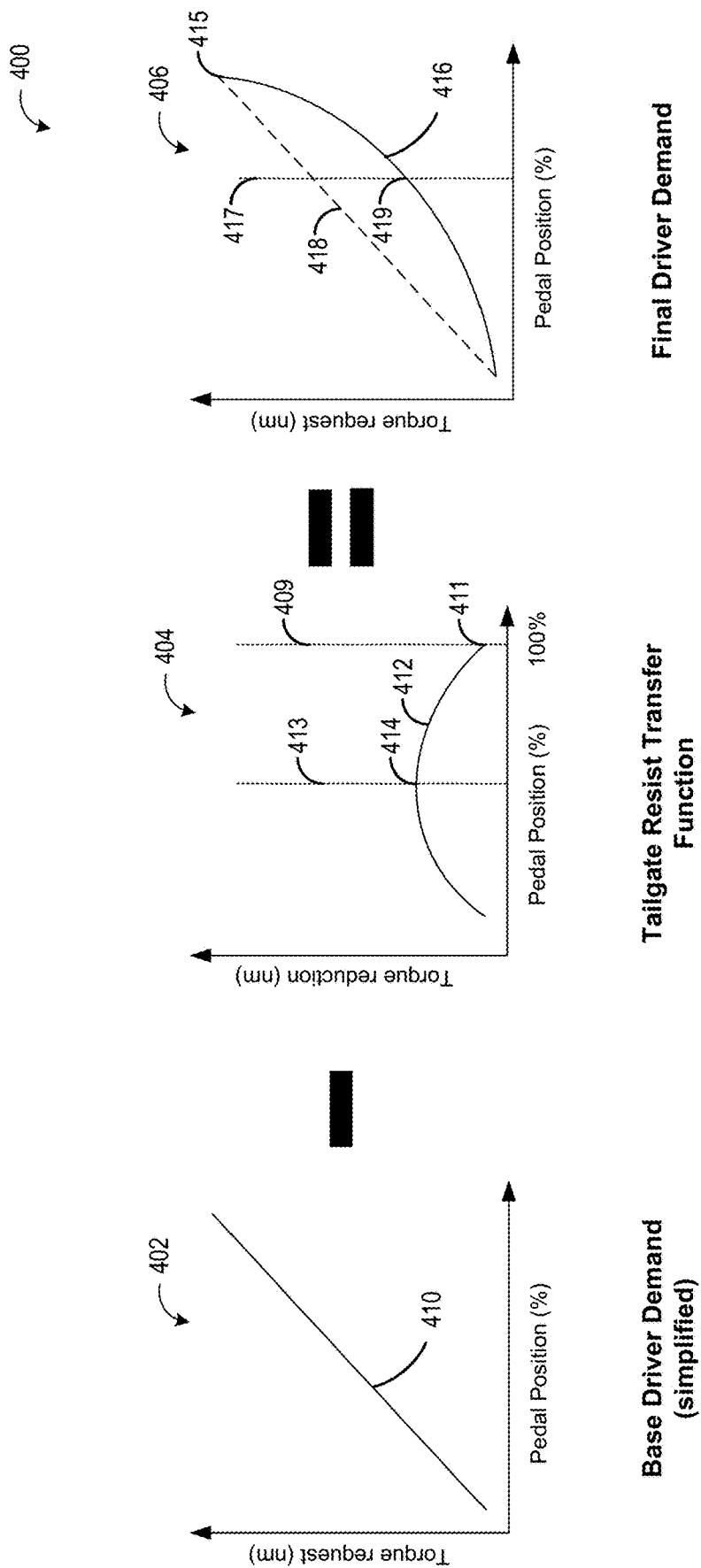
FIG. 4A is a series of graphs showing how a tailgate resist transfer function may be applied to a demand for torque of a driver of a vehicle, to modify a torque applied to one or more wheels of the vehicle.

The following description relates to systems and methods for providing an assistive action to a driver of a vehicle when accelerating towards a lead vehicle traveling along a road ahead of the vehicle. An example vehicle is depicted in FIG. 1. The vehicle may include a control system, as shown in FIG. 2. When operating in traffic, the vehicle may be following a target lead vehicle at a following distance that is greater than a first threshold following distance, less than the first threshold following distance but greater than a second threshold following distance, or less than the first threshold following distance and less than a second threshold following distance, as shown in FIGS. 3A, 3B, and 3C respectively. If the following distance decreases below the first threshold following distance, a demand for torque made by the driver may be modified via a tailgate resist transfer function, as shown in FIG. 4A. A transition factor may be included in the tailgate resist transfer function to further modify the driver demand for torque, as shown in FIG. 4B. The driver demand for torque may be further modified by a closing rate modification based on a rate at which the following distance is decreasing over time, as shown in FIG. 4C; an energy modification based on an amount of kinetic energy of the vehicle, as shown in FIG. 4D; and/or a slipstream modification based on a decreased resistance of an air flow around the vehicle caused by the target lead vehicle, as shown by FIG. 4E. An alternative embodiment of a driver demand torque adjustment may also be applied, in accordance with the assistive action system of FIG. 5. When the following distance is within the second threshold following distance, a second torque adjustment may be applied, as shown by the assistive action system of FIG. 6. An example procedure for determining whether or not to apply a torque adjustment is shown in FIG. 7. The first and second threshold following distances may be calculated in accordance with the procedure of FIG. 8. An amount of torque to be applied to adjust the driver demand for torque may be calculated in accordance with the procedure of FIG. 9, and additional limits may be applied to the driver demand for torque in accordance with the procedure of FIG. 10.

Referring now to FIG. 1, an example vehicle 5 is shown. In some examples, vehicle 5 may be a hybrid vehicle with multiple sources of torque available to one or more vehicle wheels 102. In other examples, vehicle 5 is a conventional vehicle with only an engine, or an electric vehicle with only electric machine(s). In the example shown, vehicle 5 includes an internal combustion engine 10 and an electric machine 120. Electric machine 120 may be a motor or a motor/generator. Electric machine 120 may be configured to utilize or consume a different energy source than engine 10. For example, engine 10 may consume a liquid fuel (e.g., gasoline) to produce an engine output while electric machine 120 may consume electrical energy to produce a motor output. As such, the vehicle 5 may be referred to as a hybrid electric vehicle (HEV).

In a non-limiting embodiment, electric machine 120 receives electrical power from a battery 108 to provide torque to vehicle wheels 102. Engine 10 and electric machine 120 are connected to the vehicle wheels 102 via a transmission 104. Transmission 104 may be a gearbox, a planetary gear system, or another type of transmission.

Vehicle 5 may utilize a variety of different operational modes depending on operating conditions encountered. Some of these modes may enable engine 10 to be maintained in an off state where combustion of fuel at the engine is discontinued. For example, under select operating conditions, electric machine 120 may propel the vehicle via transmission 104 as indicated by arrow 122 while engine 10 is deactivated. The select operating conditions may include a stopped condition, wherein the engine 10 may be maintained in an off state while the vehicle 5 is not moving. When the vehicle 5 begins to accelerate, the vehicle 5 may be propelled by electric machine 120, or engine 10 may be switched to an on state and may propel the vehicle 5.

During other operating conditions, electric machine 120 may be operated to charge an energy storage device such as the battery 108. For example, electric machine 120 may receive wheel torque from transmission 104 as indicated by arrow 122 where the motor may convert the kinetic energy of the vehicle to electrical energy for storage at battery 108. Thus, electric machine 120 may provide a generator function in some embodiments. However, in other embodiments, alternator 110 may instead receive wheel torque from transmission 104, or energy from engine 10, where the alternator 110 may convert the kinetic energy of the vehicle to electrical energy for storage at battery 108.

During still other operating conditions, engine 10 may be operated by combusting fuel received from a fuel system (not shown in FIG. 1). For example, engine 10 may be operated to propel the vehicle via transmission 104 as indicated by arrow 112 while electric machine 120 is deactivated. During other operating conditions, both engine 10 and electric machine 120 may each be operated to propel the vehicle via transmission 104 as indicated by arrows 112 and 122, respectively. A configuration where both the engine and the motor may selectively propel the vehicle may be referred to as a parallel type vehicle propulsion system. Note that in some embodiments, electric machine 120 may propel vehicle 5 via a first drive system and engine 10 may propel the vehicle via a second drive system.

Operation in the various modes described above may be controlled by a controller 12. For example, controller 12 may receive data from a navigation device 34 such as a global positioning system (GPS), as well as a plurality of internal and external sensors, including one or more external front-end sensors 130. In one example, the external front-end sensors 130 are used to estimate a distance between vehicle 5 and a moving target ahead of vehicle 5, and include one or more of a camera, an ultrasonic sensor, and an electromagnetic sensor. Controller 12 and the external front-end sensors 130 will be described below in more detail in reference to FIG. 2.

Turning to FIG. 2, a schematic depiction of a control system 200 of the vehicle 5 is shown, including a controller 12. The controller 12 is shown receiving information from a plurality of sensors 208 and sending control signals to a plurality of actuators 210. The controller 12 receives signals from the sensors 208 and employs the actuators 210 to adjust engine operation based on the received signals and instructions stored in a memory of the controller 12. As one example, sensors 208 may include one or more of an exhaust gas sensor, an upstream and/or downstream temperature sensor, an airflow sensor, a pressure sensor, an air/fuel ratio sensor, a catalyst temperature sensor, and/or a composition sensor, which may be coupled to various locations in the vehicle 5. The sensors 208 may also include a brake pedal position sensor 215, and an accelerator pedal position sensor 217. The actuators may include a fuel injector, a throttle, one or more valves of an engine or fuel system, etc. It should be appreciated that the examples provided herein are for illustrative purposes and other types of sensors and/or actuators may be included without departing from the scope of this disclosure.

The controller 12 may include a processor 204. The processor 204 may generally include any number of microprocessors, ASICs, ICs, etc. The controller 12 may include a memory 206 (e.g., FLASH, ROM, RAM, EPROM and/or EEPROM) that stores instructions that may be executed to carry out one more control routines. As discussed herein, memory includes any non-transient computer readable medium in which programming instructions are stored. For the purposes of this disclosure, the term tangible computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

In general, the controller 12 receives input from various vehicle sensors 208 that indicate engine, transmission, electrical and climate states. A vehicle velocity may also be communicated to the controller 12 through a velocity sensor. The controller 12 may determine whether the vehicle 5 is stopped via a signal from the brake pedal position sensor 215 and/or the controller 12 may determine whether the vehicle 5 is experiencing a positive or negative acceleration via a signal from the pedal position sensor 217. The navigation system 34 may receive information from the vehicle velocity sensor, GPS, traffic flow data, local gradient maps, etc. In one example, the navigation system 34 is an onboard GPS system.

The controller 12 may receive input data from the various sensors 208, process the input data, and trigger the actuators 210 in response to the processed input data based on instructions stored in the memory 206. For example, the controller 12 may receive input data from an air/fuel ratio sensor indicating that an air/fuel ratio of the engine is low, and as a result, the controller 12 may command a fuel injector to adjust the air/fuel ratio.

The controller 12 may also receive input data from one or more external front-end sensors 130 (e.g., the external front-end sensors 130 of FIG. 1). For example, the external front-end sensors 130 may include one or more cameras 222 mounted on a front end of the vehicle 5. Via the one or more cameras 222, images of upcoming traffic and/or road conditions may be transmitted to the controller 12. In one example, the images of upcoming traffic and/or road conditions are used to detect a target lead vehicle ahead of the vehicle 5 in a lane of the vehicle 5, and to further estimate a following distance between the vehicle 5 and the target lead vehicle. In one example, the following distance is estimated as part of an assistive action system for determining whether the vehicle 5 is within one or more threshold following distances, and responsive to the estimated following distance being within the one or more threshold following distances, adjusting a driver demand for torque (e.g., based on a signal from an accelerator pedal position) to reduce a velocity of the vehicle, thereby increasing the following distance of the vehicle 5.

The external front-end sensors 130 may include one or more ultrasonic sensors 224 mounted on the front end of the vehicle 5, which may be used to estimate the following distance of the vehicle 5. Proximity sensors such as ultrasonic sensors are widely used to detect a distance to an object. Ultrasonic sensors are typically configured to generate an ultrasonic signal with an ultrasonic transducer, and to receive an echo signal reflected back by the object. By calculating a time interval between sending the ultrasonic signal and receiving the echo signal, the distance to the object can be determined based on a propagation speed of sound through a propagation medium such as air. Ultrasonic transducers are typically configured to generate ultrasonic signals by high frequency vibrations or resonance caused by an excitation signal. For example, a pulse of electrical energy may cause a piezoelectric transducer to vibrate at a given frequency due to piezoelectricity, thereby generating an ultrasonic sound wave. The echo of the transmitted ultrasonic signal as reflected by an object may then be detected and evaluated to determine a distance to the object.

The external front-end sensors 130 may include one or more electromagnetic sensors 226 mounted on the front end of vehicle 5 that create an electromagnetic field around the vehicle and generate a signal when a target object or vehicle disrupts the electromagnetic field. A proximity of the target object or vehicle may be estimated from an amount of disruption of the electromagnetic field. The electromagnetic sensors 226 may be passive magneto-resistive sensors that do not rely on power to be activated, where signals received from the magneto-resistive sensors are in the form of changes in current as a function of magnetic field changes. The magneto-resistive sensors make use of magnetic field changes that occur when metallic compounds, such as target vehicles, pass within close proximity of their respective permanent magnets. The field changes are received by the controller to determine properties of the target vehicle's motion. The magneto-resistive sensors can determine the magnitude and direction of magnetic field variation within a range of, for example, 15 meters. If vehicle 5 is operating within the range of the electromagnetic sensors 226, the electromagnetic sensors 226 may be used to estimate the following distance of vehicle 5 behind the target lead vehicle.

In one example, the following distance of vehicle 5 may be estimated by one or more of the cameras 222, the ultrasonic sensors 224, and/or the electromagnetic sensors 226 operating in conjunction. In other examples, other types of sensors may be used to estimate the following distance, such as sensors that rely on lidar or radar technologies. It should be appreciated that the example sensors provided herein are for illustrative purposes, and other types of sensors may be used to estimate the following distance of the vehicle 5 without departing from the scope of this disclosure.

As described below in reference to FIG. 7, the following distance of vehicle 5 may be compared to one or more threshold following distances to determine whether to apply an assistive action to the vehicle 5. For example, if the vehicle 5 is within a first threshold following distance, the controller 12 may adjust a driver demand for torque to decrease a velocity of the vehicle 5, and as a result, increase the following distance of the vehicle 5 until the vehicle 5 is no longer within the first threshold following distance. In one example, the driver demand for torque is an output of the accelerator pedal position sensor 217. If the vehicle 5 is within a second threshold following distance, the driver demand for torque may be adjusted to further decrease the velocity of the vehicle 5. In one example, the second threshold following distance (e.g., a tailgating following distance) is a predetermined distance (e.g., one car length), and the first threshold following distance may be a multiple of the second threshold following distance (e.g., three car lengths). In other examples, the second threshold following distance is based on a velocity of the vehicle 5, or a combination of the predetermined distance and the velocity of the vehicle 5. For example, the second threshold following distance may be a percentage of the velocity of the vehicle 5, e.g., if the vehicle 5 is traveling at 60 mph, the second threshold following distance may be 6 feet (e.g., 10% of 60), or the greater of a velocity-based second threshold following distance and the predetermined distance (e.g., a car length, which is greater than 6 feet). Additionally, the first and second threshold following distances may be adjusted based on one or more road conditions, and/or a velocity of the target lead vehicle, among other factors. For example, if a road on which the vehicle is traveling is wet, the first and/or second threshold following distances may be increased. The estimation of following distances and calculation of adjustments to the driver demand for torque are discussed in greater detail below in reference to FIGS. 7-8.

Referring now to FIG. 3A, an exemplary following distance diagram 300 shows a following vehicle 302 (e.g., the vehicle 5 of FIG. 1) operating behind a target lead vehicle 304 on a road 306, where the following vehicle 302 and the target lead vehicle 304 are traveling in a right lane 318 of the road 306 in a direction indicated by a directional arrow 308. A following distance between the following vehicle 302 and the target lead vehicle 304 may fall into one of three following distance ranges: a first following distance range 310, a second following distance range 312, or a third following distance range 314.

The first following distance range 310 encompasses following distances, as measured from a back end of the target lead vehicle 304 indicated by dotted line 326, that are greater than a first threshold following distance shown by dotted line 330. The first following distance range 310 is depicted in FIG. 3A as extending from the dotted line 330 to a back end of the following vehicle 302 indicated by a dotted line 332. Following distances in the first following distance range 310 may represent a scenario where the following vehicle 302 is operating at a sufficient distance from the target lead vehicle 304 to be able to avert an impact in the event of a sudden brake event initiated by the target lead vehicle 304.

The second following distance range 312 is defined as a distance between the first threshold following distance shown by dotted line 330 and a second threshold following distance shown by dotted line 328. Following distances in the second following distance range 312 may represent a scenario where further movement of the following vehicle 302 toward the target lead vehicle 304 may result in tailgating, and where increasing the distance between the following vehicle 302 and the target lead vehicle 304 may be advisable.

The third following distance range 314 is defined as a distance between a back end of the target lead vehicle 304, indicated by the dotted line 326, and the second threshold following distance shown by dotted line 328. Following distances in the third following distance range 314 may represent a scenario where the following vehicle 302 is likely operating too closely to the target lead vehicle 304 to be able to avert an impact in the event of a sudden brake event initiated by the target lead vehicle 304 (e.g., tailgating).

The following vehicle 302 is considered to be in the first following distance range 310 if a distance between the front end of the following vehicle 302 and the back end of the target lead vehicle 304 is greater than the second threshold following distance (e.g., if the front end of the following vehicle 302 is to the left of dotted line 330). The following vehicle 302 is considered to be in the second following distance range 312 if a distance between the front end of the following vehicle 302 and the back end of the target lead vehicle 304 is greater than the second threshold following distance from the back end of the target lead vehicle 304, and less than the first threshold following distance (e.g., if the front end of the following vehicle 302 is between dotted lines 328 and 330). The following vehicle 302 is considered to be in the third following distance range 314 if a distance between a front end of the following vehicle 302, indicated by a dotted line 322, and the back end of the target lead vehicle 304, indicated by the dotted line 326, is less than the second threshold following distance (e.g., if the front end of the following vehicle 302 is between dotted lines 326 and 328).

In FIG. 3A, the following vehicle 302 is following the target lead vehicle 304 at a following distance 320, where the following distance 320 is a distance between the front end of the vehicle 302 indicated by a dotted line 322, and the back end of the vehicle 304 indicated by the dotted line 326. The following distance 320 of the following vehicle 302 is greater than the first threshold following distance from the back end of the target lead vehicle 304, whereby the following vehicle 302 is in the first following distance range 310.

Turning to FIG. 3B, an exemplary following distance diagram 350 shows the following vehicle 302 following the target lead vehicle 304 at a following distance 354, where the following distance 354 is a distance between the front end of the following vehicle 302 indicated by a dotted line 352, and the back end of the target lead vehicle 304 indicated by the dotted line 326. The following distance 354 of the following vehicle 302 is less than the first threshold following distance indicated by dotted line 330, but greater than the second threshold following distance indicated by the dotted line 328, whereby the following vehicle 302 is in the second following distance range 312. The following vehicle 302 may be transitioning into or out of the following position behind the target lead vehicle 304 (e.g., into the left lane 317, or after being passed by the target lead vehicle 304).

Referring now to FIG. 3C, an exemplary following distance diagram 360 shows the following vehicle 302 following the target lead vehicle 304 at a following distance 364, where the following distance 364 is a distance between the front end of the vehicle 302 indicated by a dotted line 362, and the back end of the vehicle 304 indicated by the dotted line 326. The following distance 364 of the following vehicle 302 is less than the second threshold following distance from the back end of the target lead vehicle 304, whereby the following vehicle 302 is in the third following distance range 314. The following vehicle 302 may be operating too close to the target lead vehicle 304 to avert an impact in the event of a sudden brake event initiated by the target lead vehicle 304.

The first threshold following distance and the second threshold following distance referred to in FIGS. 3A, 3B, and 3C may be calculated dynamically based on factors including a velocity of the following vehicle 302, a rate of change of the following distance, and/or one or more road conditions, weather conditions, lighting conditions, etc. The calculation of the first and second threshold following distances is described in greater detail below in relation to FIG. 8.

FIG. 4A shows a graphical representation 400 of an application of an assistive action to a base driver demand for torque by a driver of a vehicle (e.g., the vehicle 5 of FIG. 1), where the base driver demand for torque is generated as a result of an output of an accelerator pedal position sensor (e.g., the accelerator pedal position sensor 217 of control system 200 of FIG. 2) when the driver presses an accelerator pedal of the vehicle. For example, a base driver demand for torque may be generated when a driver accelerates to reduce a following distance between the vehicle and a target lead vehicle. The base driver demand is adjusted to a final driver demand as a result of applying a tailgate resist function. The assistive action may reduce an amount of torque generated at one or more wheels of the vehicle in accordance with the tailgate resist transfer function. In one example, the assistive action is applied based on an operation of the vehicle in one of three modes: a normal mode, where an assistive action is not applied; a transition mode, where a weighted assistive action may be applied; and a tailgating mode, where the assistive action is applied. The normal mode, transition mode, and tailgating mode may correspond to the first following distance range 310, the second following distance range 312, and the third following distance range 314, respectively, of FIGS. 3A, 3B, and 3C. For example, when the vehicle is operating in the first following distance range 310 of FIGS. 3A, 3B, and 3C, the vehicle is in the normal mode; when the vehicle is operating in the second following distance range 312 of FIGS. 3A, 3B, and 3C, the vehicle is in the transition mode; and when the vehicle is operating in the third following distance range 310 of FIGS. 3A, 3B, and 3C, the vehicle is in the tailgating mode.

Graphical representation 400 includes a base driver demand graph 402, a tailgate resist transfer function graph 404, and a final driver demand graph 406. Each of the graphs 402, 404, and 406 include a horizontal axis indicating the accelerator pedal position of the accelerator pedal. The accelerator pedal position is expressed as a percentage, where a pedal position percentage of 100% corresponds to the driver fully pressing the accelerator pedal to a maximum position for a maximum acceleration of the vehicle, and a pedal position percentage of 0% corresponds to the driver not applying pressure to the accelerator pedal.

The base driver demand graph 402 includes a vertical axis indicating a torque request, where the torque request is generated by a controller of the vehicle based on the accelerator pedal position, and used to deliver torque to the one or more wheels of the vehicle. In the base driver demand graph 402, a line 410 shows a linear relationship between the torque request and the pedal position, where the torque request generated by the controller is directly proportional to the pedal position. If no assistive action is provided, torque is delivered to the one or more wheels of the vehicle based on the torque request generated by the corresponding pedal position in accordance with base driver demand graph 402.

It should be appreciated that the base driver demand graph 402 is simplified, where line 410 shows the torque request as directly proportional to the pedal position. In some examples, the torque request may be generated as a nonlinear function of pedal position (e.g., where line 410 is not a straight line). It should be appreciated that slight modifications may be made to the shape and/or linearity of line 410 without departing from the scope of this disclosure.

The tailgate resist transfer function graph 404 includes a vertical axis indicating a torque reduction, where the torque request of simplified base driver demand graph 402 is reduced by an amount of torque indicated by the tailgate resist transfer function graph 404, based on a pedal position. The tailgate resist transfer function graph 404 includes a line 412, which describes a change in a reduction in torque (e.g., from the torque request of the base driver demand graph 402) as the accelerator pedal transitions from a low pedal position percentage to a high pedal position percentage. For example, as shown by line 412, when the pedal position percentage is low, an amount of torque by which the torque request of base driver demand graph 402 is reduced is low. As the pedal position percentage increases (e.g., as the driver presses the accelerator pedal), the amount of torque by which the torque request of the base driver demand graph 402 is reduced increases, to a maximum torque reduction at point 414 on line 412, where line 412 intersects with a maximum torque reduction line 413 (e.g., when the accelerator pedal is pressed roughly halfway from an initial pedal position to a maximum pedal position by the driver). As the pedal position percentage continues to increase towards the maximum pedal position, the amount of torque by which the torque request of the base driver demand graph 402 is reduced decreases, until the amount of the torque reduction applied to the torque request of the base driver demand graph 402 reaches zero at point 411 of line 412, where line 412 intersects with a maximum pedal position line 409 (e.g., where the pedal position percentage reaches the maximum pedal position (100%).

The result of applying the tailgate resist transfer function indicated by line 412 of graph 404 to the base driver demand indicated by line 410 of graph 402 (herein, a driver demand adjustment) is shown by a line 416 of the final driver demand graph 406. The vertical axis of the final driver demand graph 406 is a torque request generated in accordance with a pedal position, as seen in the simplified base driver demand graph 402. In the final driver demand graph 406, line 416 shows an adjustment of a torque request generated by a pedal position as a function of the pedal position, with respect to the baseline torque request from the simplified base driver demand graph 402 (indicated in the final driver demand graph 406 by dotted line 418). For example, when the pedal position percentage is low, a relatively small driver demand adjustment is made to the torque request. As the pedal position percentage increases over a first pedal position increase, a larger driver demand adjustment is made to the torque request (e.g., a reduction), until reaching a maximum driver demand adjustment at point 419, where line 416 intersects with a maximum driver demand adjustment line 417. As the pedal position percentage continues to increase, the driver demand adjustment made to the torque request decreases to 0 in accordance with line 416 until point 415 of line 416, where line 416 intersects the dashed line 418 (e.g., when the accelerator pedal is fully pressed). When the accelerator pedal is fully pressed (e.g., at 100%), the torque request is not adjusted, and the torque request is directly proportional to the pedal position, as in the base driver demand graph 402. Thus, at an initial pedal position and at the maximum pedal position, the torque request of the base driver demand (e.g., from the base driver demand graph 402) is not adjusted.

The tailgate resist transfer function may be applied to the base driver demand based on the vehicle being within one or more threshold following distances. For example, the vehicle may be a following vehicle traveling behind a target lead vehicle in a transition mode outside a threshold following distance (e.g., the second threshold following distance indicated by dotted line 328 in FIGS. 3A-3C). The driver may press the accelerator pedal to increase a velocity of the following vehicle. In a first condition, an increased velocity of the following vehicle is less than a velocity of the target lead vehicle, where the following vehicle remains outside the threshold following distance. As the following vehicle remains outside the threshold following distance, a base driver demand for torque (e.g., by pressing the accelerator pedal) may not be adjusted, whereby the tailgate resist transfer function is not applied, and the torque request generated by the controller is directly proportional to the pedal position as indicated by the simplified base driver demand graph 402.

In a second condition, the increased velocity of the following vehicle is greater than the velocity of the target lead vehicle, and as the following vehicle closes the distance between the following vehicle and the target lead vehicle, the following vehicle transitions from being outside the threshold following distance (e.g., in the transition mode) to being within the threshold following distance (e.g., in the tailgating mode). As the following vehicle transitions from being outside the threshold following distance to being within the threshold following distance, the tailgate resist transfer function may be applied to the base driver demand for torque to generate a driver demand adjustment. As a result of applying the driver demand adjustment to the base driver demand for torque, the torque request generated by the controller stops being directly proportional to the pedal position (as indicated by the simplified base driver demand graph 402), and the base driver demand for torque is reduced as a function of accelerator pedal position in accordance with the tailgate resist transfer function, as shown in the final driver demand graph 406.

An effect of adjusting (e.g., reducing) the base driver demand for torque in accordance with the tailgate resist transfer function is that if the driver accelerates in the second condition, while the vehicle is within the threshold following distance, less torque may be provided to the one or more wheels of the vehicle than if the driver accelerates in the first condition, while the vehicle is outside the threshold following distance. When less torque is provided to the one or more wheels of the vehicle, an acceleration of the vehicle is reduced, and the driver may perceive an increased resistance or lack of responsiveness of the vehicle to the base driver demand for torque. Further, a rate of change of an adjustment (e.g., a reduction) to the acceleration of the vehicle increases or decreases as a function of the base driver demand (e.g., as a function of pedal position). When the accelerator pedal position reaches 100%, the tailgate resist transfer function is no longer applied to the base driver demand for torque and the torque request is proportional to the base driver demand. Thus, as the driver begins to accelerate, the driver may notice a small reduction in a responsiveness of the vehicle to pressing the accelerator pedal. As the driver accelerates more rapidly, the driver may notice a greater reduction in the responsiveness of the vehicle to pressing the accelerator pedal. If the driver accelerates at a maximum acceleration by fully pressing the accelerator pedal, the driver may notice little to no reduction in the responsiveness of the vehicle to pressing the accelerator pedal.

In addition to the tailgate resist transfer function, other modifications may be applied to the driver demand adjustment to generate the final driver demand, as shown in FIGS. 4B-4E. Turning now to FIG. 4B, a graphical representation 420 shows the base driver demand graph 402 and the tailgate resist transfer function graph 404 of FIG. 4A, where a further modification of a driver demand adjustment is made in the form of a transition factor 422 that is multiplied by the tailgate resist transfer function 404 to generate the final driver demand indicated by a line 428 of the final driver demand graph 426. An effect of applying the transition factor on the final driver demand graph 446 may be seen as a change of a curvature of line 428 with respect to line 416 of the final driver demand graph 406 of FIG. 4A.

In one example, the transition factor is a weighting of the driver demand adjustment that is applied when the vehicle is operating in transition mode (e.g., within the second following distance range 312 of FIG. 3), as the vehicle transitions into or out of a tailgating range (e.g., the third following distance range 314 of FIGS. 3A, 3B, and 3C), where the driver demand adjustment is proportionally increased or decreased by the transition factor. For example, the driver demand adjustment may be proportionally increased, resulting in a corresponding decrease in a torque request, or the driver demand adjustment may be proportionally decreased, resulting in a corresponding increase in a torque request. In one example, the weighting is based on a following distance of the vehicle, where the driver demand adjustment is reduced in proportion to the following distance (e.g., the farther the following vehicle moves from a lead vehicle, the lesser the driver demand adjustment).

In one example, the transition factor based on the following distance and two threshold following distances, and is calculated using a formula of:

$$TF = 1 - (FD - STFD)/(FTFD - STFD)$$

Where TF is the transition factor, FD is the following distance, STFD is a second threshold following distance (e.g., the second threshold following distance of FIGS. 3A-3C), and FTFD is a first threshold following distance (e.g., the first threshold following distance of FIGS. 3A-3C). For example, in graph 426, the final driver demand is adjusted by the transition factor 422 such that the driver demand adjustment to the base driver demand of graph 402 is reduced (e.g., in relation to the final driver demand graph 406 of FIG. 4A), such that the final driver demand shown in graph 426 is more similar to base driver demand of graph 402. In this way, the transition factor 422 may be used to lessen an effect of the tailgate transfer function as a function of following distance as the vehicle passes out of a tailgating range. This also allows for a proportional transition into a full driver demand adjustment as the vehicle moves through the transition mode into the tailgating mode. The driver demand may be discounted via a linear equation, or via higher power, non-linear, with/without hysteresis, etc. It should be appreciated that the transition factors described herein are non-limiting examples for illustrative purposes, and other transition factors or weightings may be included without departing from the scope of this disclosure.

FIG. 4C shows a graphical representation 430 with the base driver demand graph 402 and the tailgate resist transfer function graph 404 of FIG. 4A, where a further modification of a driver demand adjustment is made in the form of a closing rate modification. The closing rate modification may comprise an additional reduction of a torque request, applied to a first reduction of the torque request comprised by the driver demand adjustment generated by the tailgate resist transfer function, to generate the final driver demand indicated by a line 438 of the final driver demand graph 436. The closing rate modification is depicted in FIG. 4C as a line 434 of a closing rate modification graph 432. In one example, the closing rate modification shown by line 434 is governed by a linear function of a closing rate of the following vehicle, where the closing rate is calculated as a change in following distance over a change in time. For example, as the closing rate increases, the corresponding torque reduction increases proportionally. Thus, the closing rate modification may apply a reduction to a velocity of the following vehicle that varies with an acceleration of the following vehicle in accordance with a slope of line 434. The effect of applying the closing rate modification is shown on the final driver demand graph 436 as a downward shift and a change of a curve of line 438 with respect to line 416 of the final driver demand graph 406 of FIG. 4A, where the change of the curve of line 438 depends on a slope of line 434 of the closing rate modification graph 432. In another embodiment, the closing rate modification is not an additional reduction of the torque request, and is a factor to be multiplied by the tailgate resist transfer function 404 to generate the final driver demand.

Referring now to FIG. 4D, a graphical representation 440 is shown with the base driver demand graph 402 and the tailgate resist transfer function graph 404 of FIG. 4A, where a modification of a driver demand adjustment is made in the form of an energy modification. The energy modification may comprise an additional reduction of a torque request, applied to a first reduction of the torque request comprised by the driver demand adjustment generated by the tailgate resist transfer function, to generate the final driver demand indicated by a line 448 of the final driver demand graph 446. The energy modification is depicted in FIG. 4D as a line 444 of an energy modification graph 442. In one example, the energy modification shown by line 444 is governed by a linear function of a vehicle energy of the following vehicle, where the vehicle energy is an amount of kinetic energy of the following vehicle. For example, the following vehicle may be a vehicle that is traveling at a high velocity, where the kinetic energy of the following vehicle may be high, or the following vehicle may be a vehicle that is traveling at a low velocity, where the kinetic energy of the following vehicle may be low. Other factors such as payload, trailer weight (if towing), vehicle weight, etc. may also affect the kinetic energy of the following vehicle. If the following vehicle has a high kinetic energy, a greater torque adjustment (e.g., the driver demand torque adjustment) may be applied to the following vehicle to reduce the velocity of the following vehicle. The torque request may be reduced in an inverse proportion to the amount of kinetic energy of the following vehicle, based on a slope of the line 444. The effect of applying the energy modification is shown in the final driver demand graph 446 as a downward shift and a change of a curve of line 448 with respect to line 416 of the final driver demand graph 406 of FIG. 4A, where the change of the curve of line 448 depends on a slope of line 444 of the energy modification graph 442. In another embodiment, the energy modification is not an additional reduction of the torque request, and is a factor to be multiplied by the tailgate resist transfer function 404 to generate the final driver demand.

Referring now to FIG. 4E, a graphical representation 450 is shown with the base driver demand graph 402 and the tailgate resist transfer function graph 404 of FIG. 4A, where a modification of a driver demand adjustment is made in the form of a slipstream modification. The slipstream modification may comprise an additional reduction of a torque request, applied to a first reduction of the torque request comprised by the driver demand adjustment generated by the tailgate resist transfer function, to generate the final driver demand indicated by a line 458 of the final driver demand graph 456. The slipstream modification is depicted in FIG. 4E as a line 454 of a slipstream modification graph 452. In one example, the slipstream modification shown by line 454 is governed by a linear function of the following distance of the following vehicle, where the following distance may be correlated with an air flow around the following vehicle. In another example, the slipstream modification shown by line 454 is based on a combination of the following distance and a shape of the target lead vehicle. For example, if the target lead vehicle has a large profile, a slipstream effect may be large, and if the target lead vehicle has a small profile, the slipstream effect may be small. As the following vehicle approaches a lead vehicle, a resistance of the air flow around the following vehicle may change as a result of the slipstream effect generated by an air flow around the lead vehicle. As the following vehicle gets closer to the lead vehicle, the resistance of the air flow may decrease, resulting in a reduction in the amount of torque used to propel the vehicle at the requested vehicle speed, and thus in some examples causing an increase in the velocity of the following vehicle (e.g., where a torque request is maintained constant). In order to offset the increase in the velocity of the following vehicle, the slipstream modification may be applied to the driver demand adjustment in accordance with the linear function represented by line 454. The effect of applying the slipstream modification on the final driver demand graph 456 may be seen in a downward shift and a change of a curve of line 458 with respect to line 416 of the final driver demand graph 406 of FIG. 4A, where the change of the curve of line 458 depends on a slope of line 454 of the energy modification graph 452. In one example, the slipstream modification depends on other factors including a temperature of the environment, an amount of wind in the environment, a speed of the lead vehicle, a speed of the following vehicle, a shape of the lead vehicle, etc. In another embodiment, the slipstream modification is not an additional reduction of the torque request, and is a factor to be multiplied by the tailgate resist transfer function 404 to generate the final driver demand.

Thus, the transition factor 422 of FIG. 4B, the closing rate modification indicated by line 434 of FIG. 4C, the energy modification indicated by line 444 of FIG. 4D, and the slipstream modification indicated by line 454 of FIG. 4E comprise modifications to the driver demand adjustment that may be applied individually or collectively to reduce a torque request issued by a controller of a following vehicle based on an accelerator pedal position. As an example, in a first condition, the following vehicle is operating in the normal mode, outside a threshold following distance, and a torque request of the following vehicle is not adjusted by a driver demand adjustment. In a second condition, the following vehicle is operating in the tailgating mode, within the threshold following distance, and the torque request of the following vehicle is reduced by a driver demand adjustment based on the tailgate resist transfer function. In a third condition, the following vehicle is operating in the transition mode, and the torque request of the following vehicle is reduced by a driver demand adjustment based on a combination of the tailgate resist transfer function and the transition factor. In a fourth condition, the following vehicle is operating in the transition mode and quickly closing a distance to a lead vehicle, and the torque request of the following vehicle is reduced by a driver demand adjustment based on a combination of the tailgate resist transfer function, the transition factor, and the closing rate modification. In a fifth condition, the following vehicle is in the transition mode, is quickly closing a distance to a lead vehicle, has a high kinetic energy, and the torque request of the following vehicle is reduced by a driver demand adjustment based on a combination of the tailgate resist transfer function, the transition factor, the closing rate modification, and the energy modification. In a sixth condition, a following distance between the following vehicle and the lead vehicle is within a threshold distance for incurring a slipstream effect, and the torque request of the following vehicle is reduced by a driver demand adjustment based on a combination of the tailgate resist transfer function and the slipstream modification. In this way, one or more of the transition factor, the closing rate modification, the energy modification, and the slipstream modification may be applied to the driver demand adjustment generated by the tailgate resist transfer function depending on how close the following vehicle is to the lead vehicle, how fast the following vehicle is moving, the kinetic energy of the vehicle, and so on.

Figure 5:
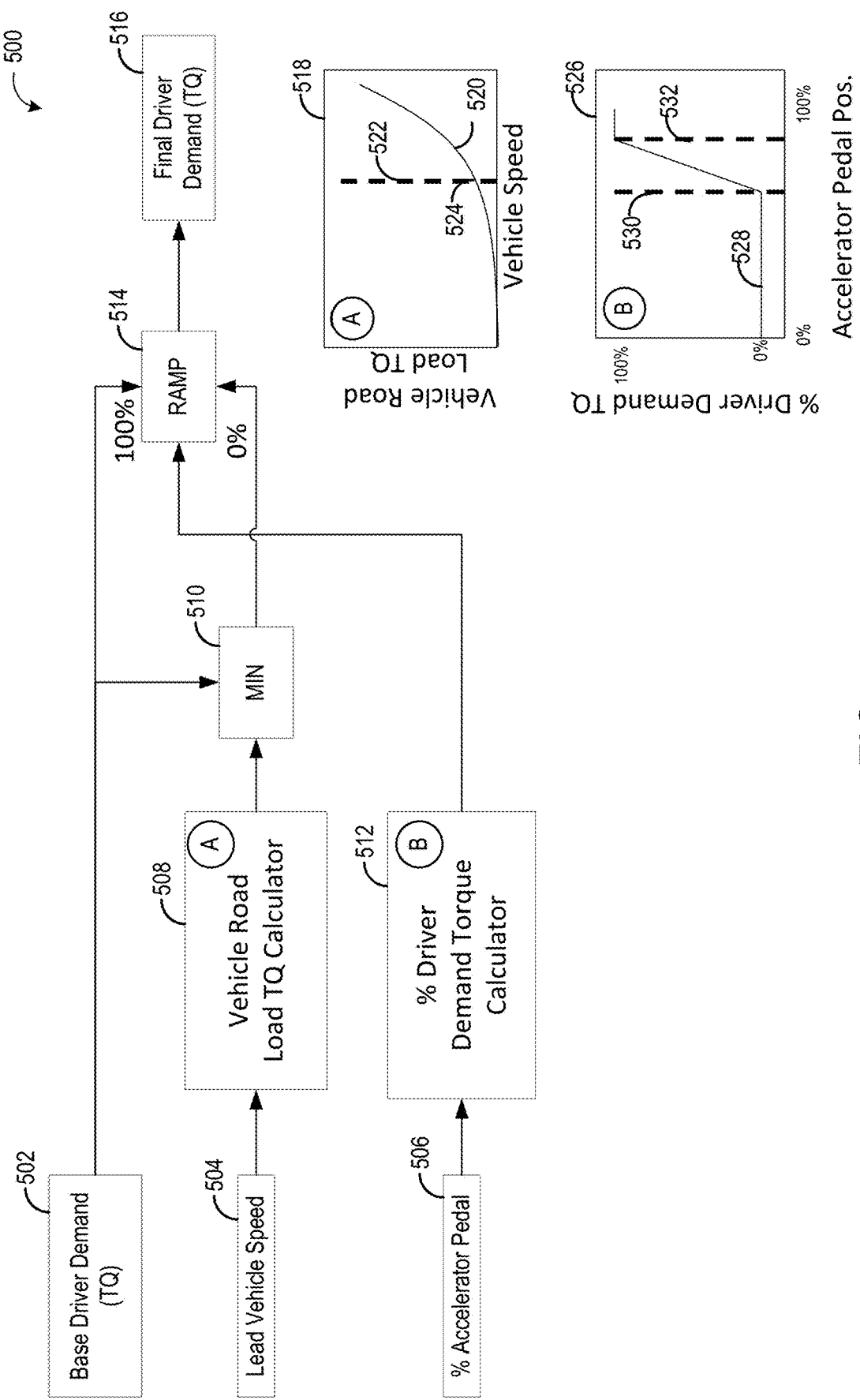
FIG. 5 shows an assistive action system with a first modification to a driver torque request.

Referring now to FIG. 5, a block diagram of an assistive action system 500 of a vehicle shows another embodiment of a process whereby a final demand torque is generated from a driver demand torque. In one example, the alternate process shown by assistive action system 500 is used to generate a first driver demand adjustment in a scenario in which a following vehicle is following a target lead vehicle while operating in a transition mode or a tailgating mode (e.g., within the second or third following distance ranges 312 and 314 of FIGS. 3A-3C).

The assistive action system 500 takes as an input a base driver demand 502, a lead vehicle speed 504, and an accelerator pedal position 506 (e.g., of the following vehicle), and generates as an output a final driver demand 516. The base driver demand 502 is an amount of torque demanded by a driver of the following vehicle (e.g., via an accelerator pedal) to power one or more wheels of the vehicle, and the final driver demand 516 is an amount of torque requested by a controller of the vehicle to power the one or more wheels of the vehicle responsive to the base driver demand 502 (e.g., an amount of torque that is actually delivered to the wheels). The base driver demand 502 may be the same as or similar to the torque request indicated by the vertical axis of the base driver demand graph 402 described in relation to FIG. 4A, and the base driver demand 502 may be the same as or similar to the torque request indicated by the vertical axis of the final driver demand graph 406 described above in relation to FIG. 4A.

The base driver demand 502 is an input into a ramp block 514, where the base driver demand 502 may be adjusted to generate the final driver demand 516. The base driver demand 502 is also an input into a MIN block 510. The MIN block 510 takes, as a second input, a vehicle road load torque outputted by a vehicle road load torque calculator 508. In one example, the vehicle road load torque calculator 508 is a lookup table. The vehicle road load torque calculator 508 takes as input a lead vehicle speed 504, and outputs a vehicle road load torque of the following vehicle corresponding to the vehicle speed 504 (e.g., an amount of torque to be applied by the following vehicle to match the vehicle speed of the lead vehicle). The MIN block 510 compares the base driver demand 502 (e.g., the first input) and the vehicle road load torque outputted by the vehicle road load torque calculator 508 (e.g., the second input), and outputs a torque that is the lesser of the base driver demand 502 and the vehicle road load torque corresponding to the vehicle speed 504. The output of the MIN block 510 is an input into the ramp block 514.

A graph 518 shows a graphical depiction of a calculation of the vehicle road load torque by the vehicle road load torque calculator 508 based on the vehicle speed 504. Graph 518 includes a horizontal axis indicating vehicle speed, and a vertical axis indicating vehicle road load torque. A line 520 shows the vehicle road load torque as a function of vehicle speed, where when the vehicle speed is low, a low amount of torque is applied to maintain the vehicle at the vehicle speed, and as the vehicle speed increases, the amount of torque applied to maintain the vehicle at the vehicle speed increases non-linearly. A dashed line 522 indicates an example lead vehicle speed, where point 524 on line 520 indicates a road load torque of the following vehicle that is outputted by the vehicle road load torque calculator 508, corresponding to an amount of torque to apply to match the example lead vehicle speed indicated by dashed line 522.

The ramp block 514 also takes as input a driver demand torque expressed as a percentage, shown as an output of a driver demand torque calculator 512. The driver demand torque calculator 512 takes as input the accelerator pedal position 506, where the accelerator pedal position 506 is expressed as a percentage ranging from 0% (accelerator pedal not actuated by the driver) to 100% (accelerator pedal actuated to a fully open throttle position by the driver). The driver demand torque calculator 512 outputs a driver demand torque percentage based on the accelerator pedal position 506.

A graph 526 shows a graphical depiction of a calculation of the driver demand torque percentage by the driver demand torque calculator 512 based on the accelerator pedal position 506. Graph 526 includes a horizontal axis indicating accelerator pedal position expressed as a percentage, and a vertical axis indicating driver demand torque expressed as a percentage. A line 528 shows the driver demand torque percentage as a function of accelerator pedal position. Line 528 indicates that as the accelerator pedal position increases from 0%, the corresponding driver demand torque percentage is maintained at 0% until reaching a first threshold accelerator pedal position indicated by a dashed line 530. When the accelerator pedal position increases past the first threshold accelerator pedal position, the corresponding driver demand torque percentage increases rapidly until reaching a second threshold accelerator pedal position indicated by a dashed line 532, where the driver demand torque percentage is close to a maximum accelerator pedal position (e.g., 90%).

The driver demand torque percentage outputted by the driver demand torque calculator 512 is an input into the ramp block 514, along with the initial base driver demand 502, and the lesser of the vehicle road load torque outputted by the vehicle road load torque calculator 508 and the base driver demand 502, which is outputted by the MIN block 510. The ramp block 514 applies the driver demand torque percentage to a torque range, where the torque range is bounded by the base driver demand torque and an amount of torque used to maintain the following vehicle at the lead vehicle speed, to output a final driver demand torque. For example, if the base driver demand for torque is X, the amount of torque used to maintain the following vehicle at the lead vehicle speed is Y, Y is less than X, and the driver demand torque percentage is 50%, then the final driver demand torque outputted by the ramp block 514 is an amount of torque halfway between X and Y.

An effect of applying the driver demand torque percentage outputted by the driver demand torque calculator 512 at the ramp block 514 may be that at relatively low torque requests (e.g., when accelerator pedal position is relatively small), the final driver demand torque is equal to the vehicle road load torque, so that the following vehicle speed matches the speed of the lead vehicle, until the accelerator pedal position reaches a threshold accelerator pedal position (e.g., the threshold accelerator pedal position indicated by dashed line 530 of graph 526), after which the driver demand torque percentage is rapidly increased as the accelerator pedal position approaches a maximum accelerator position (e.g., 80-100%). As the driver demand torque percentage is increased (e.g., pedal position is increased), the driver demand adjustment is reduced, whereby at a close-to-maximum accelerator pedal position (e.g., 90%) the final driver demand 516 is equal to the base driver demand 502. Thus, as an acceleration of the driver approaches a maximum acceleration, a demand of the driver for increased torque is respected (e.g., not modified).

What this achieves is a soft stop or slow down at a speed of the target lead vehicle at a calibrated distance behind the target lead vehicle until the accelerator pedal is pressed harder, where the soft stop is scaled based on the target lead vehicle speeding up and slowing down. From a perspective of the driver, as the driver approaches the target lead vehicle, when a threshold following distance is passed, the controller adjusts any driver demands for torque to match the speed of the target lead vehicle. If the driver continues to apply pressure to the accelerator pedal, once the threshold accelerator pedal position is passed, the controller adjusts the torque that is delivered to match the driver demand for torque.

Figure 6:
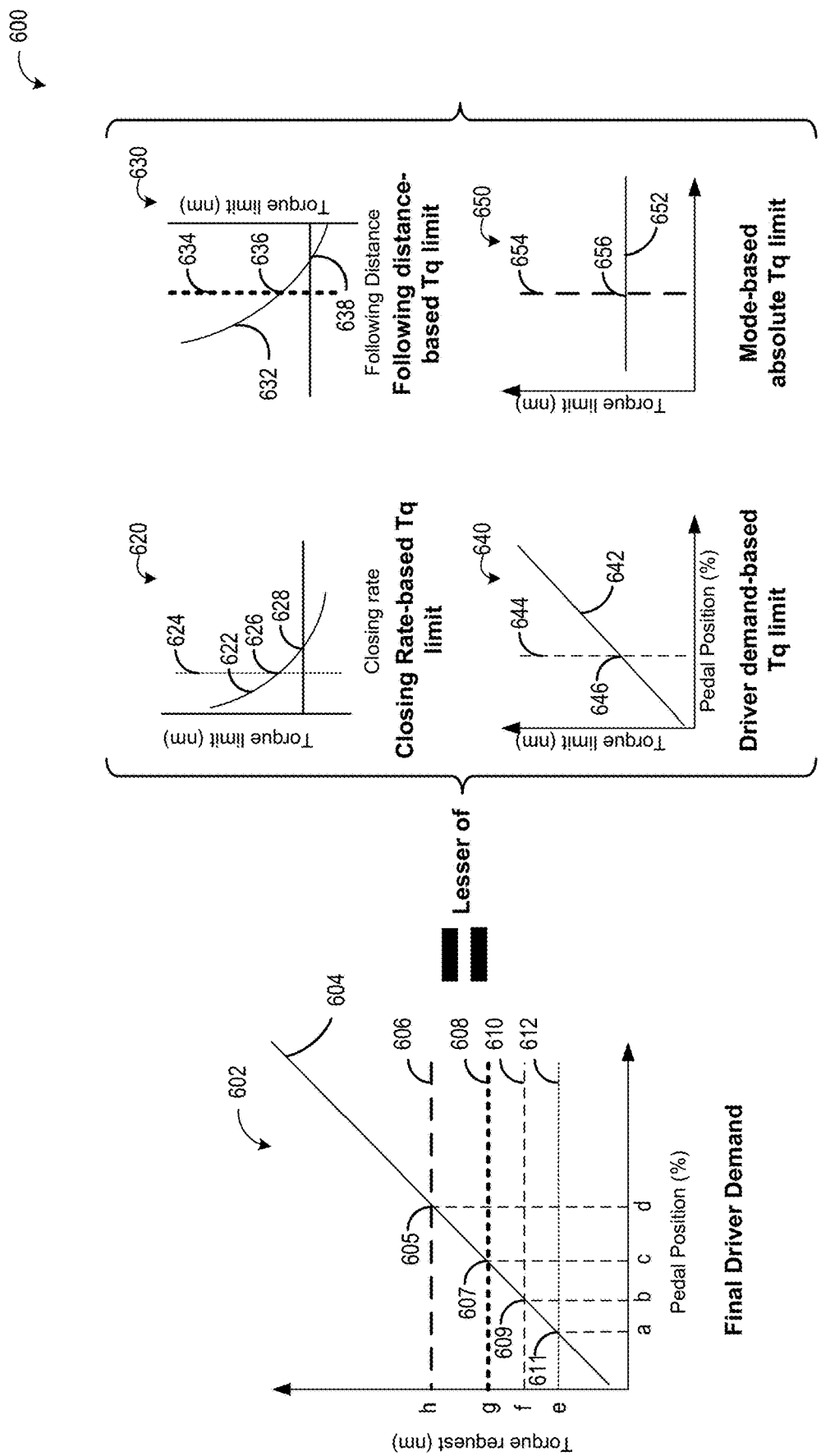
FIG. 6 shows an assistive action system with a second modification to a driver torque request.
Figure 7:
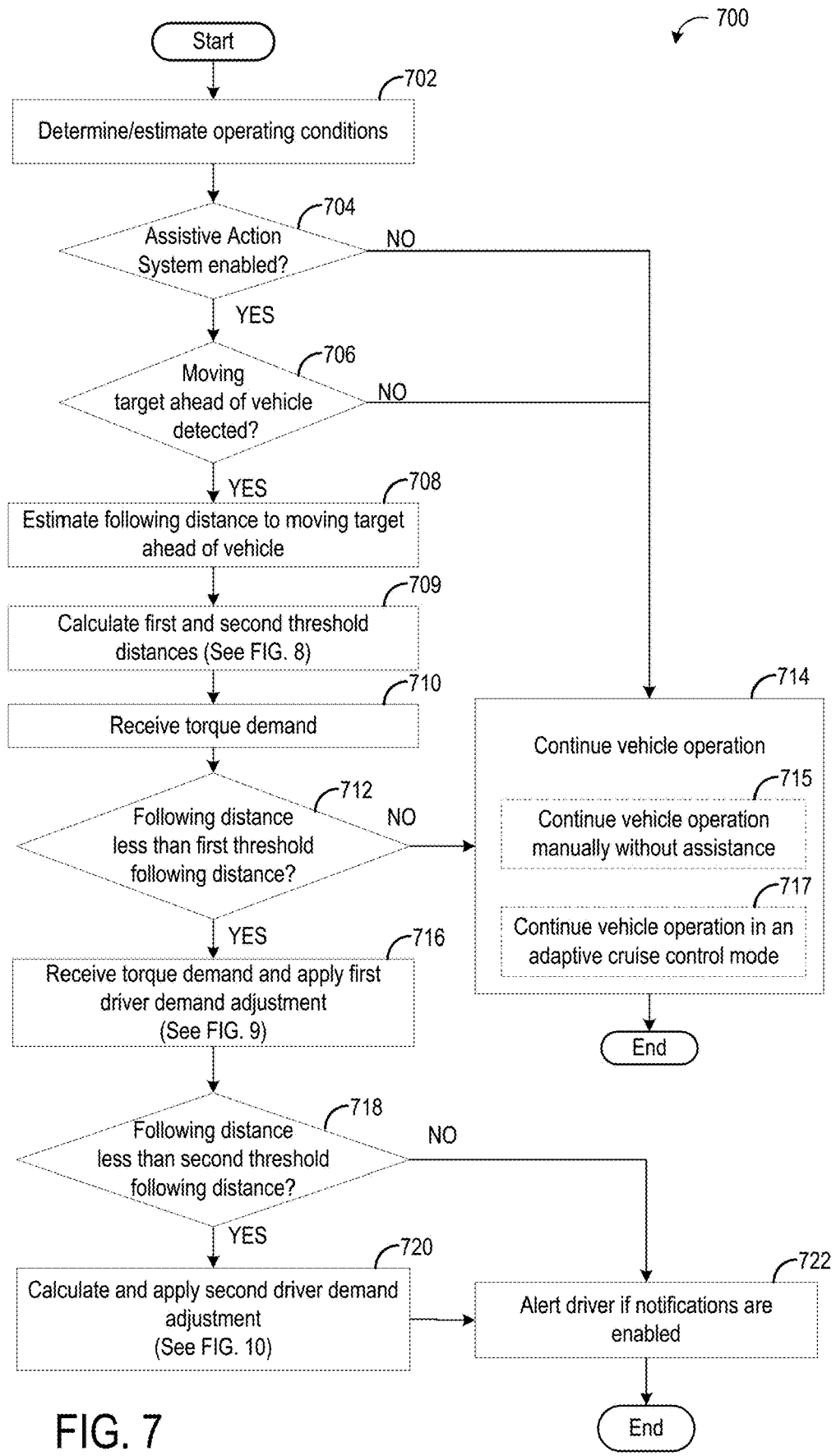
FIG. 7 shows a flow chart illustrating an example method for determining how a driver demand for torque may be modified based on a following distance.

Referring now to FIG. 6, a graphical depiction of an assistive action algorithm 600 of an assistive action system of a vehicle is shown for generating a final driver demand torque from a driver demand torque via a second driver demand adjustment. In one example, the assistance action algorithm is used in a scenario in which the vehicle is following a target lead vehicle at a following distance that is within a second threshold following distance (e.g., the third following distance range 314 of FIGS. 3A-3C), where the vehicle is tailgating. In some examples, the second alternative driver demand adjustment may be applied after a first driver demand adjustment (e.g., the first driver demand adjustment described in relation to FIGS. 4A-E), and may represent a more aggressive adjustment to the driver demand torque than the first driver demand adjustment.

FIG. 6 graphically shows an additional or alternative embodiment for controlling torque when the following vehicle is within a threshold range of a lead vehicle, such as when the following vehicle is within the third range of distances shown in FIG. 3A (e.g., in a tailgating mode). FIG. 6 includes a final driver demand graph 602, with an accelerator pedal position expressed as a percentage along a horizontal axis and a torque request along a vertical axis, where a line 604 shows torque request as a function of pedal position. While in FIG. 6 line 604 is depicted as straight, indicating a relationship between the pedal position and the torque request that is linear (e.g., as in the base driver demand graph 402 of FIG. 4A), in other examples line 604 may not be straight, where the relationship between the pedal position and the torque request is not linear (e.g., as in the final driver demand graph 406 of FIG. 4A).

In the example shown in FIG. 6, the adjustment to the driver demanded torque includes applying a torque limit to the torque request generated by the final driver demand. The final driver demand graph 602 may show how the limit to the torque request may be applied to a final driver demand torque request, for example, to aggressively constrain the final driver demand in the event of a rapid shortening of the following distance of the vehicle. In one example, the torque limit is selected from one or more torque limits that may be applied to the final driver demand torque request, which include a torque limit based on a following distance, a torque limit based on a rate of change of the following distance (e.g., a closing rate), a torque limit based on the driver demand torque request, and a torque limit based on an absolute torque limit for a mode of the vehicle. In the example shown in FIG. 6, a single operating point of a drive cycle is used to calculate the four example torque limits, and thus each torque limit shown in FIG. 6 is based on the same operating point and thus the same conditions (e.g., same driver demand torque, pedal position, distance to lead vehicle, etc.).

The calculation of a closing rate-based torque limit, an absolute distance limit, a driver demand torque request limit, and a mode-based absolute torque limit is shown by a series of graphs 620, 630, 640, and 650. For example, the closing rate-based torque limit may be calculated in accordance with a closing rate-based torque limit graph 620, with a closing rate depicted along a horizontal axis, and a torque limit to be applied depicted along a vertical axis. The closing rate of the vehicle may comprise a rate at which the vehicle is closing a following distance (e.g., a rate at which the following distance is decreasing) between the vehicle and a target lead vehicle, where a high rate indicates that the vehicle is closing the following distance rapidly, and a low rate indicates that the vehicle is closing the following distance slowly. The rate-based torque limit graph 620 includes an example torque line 622 that shows torque limit as a function of the closing rate. Line 622 is nonlinear, where as the closing rate increases (e.g., as the vehicle closes the following distance), the corresponding torque limit to apply decreases, until reaching a point 628 on torque line 622 where the corresponding torque limit reaches zero. When the torque limit decreases to zero, no requested torque may be delivered. In one example, if the torque limit decreases below zero (e.g., a negative torque limit), the torque limit is zero, where requested torque is not delivered. In another example, if the torque limit decreases below zero, the torque limit is zero, where requested torque is not delivered, and additionally one or more brakes of the vehicle are applied to reduce a velocity of the vehicle. In other words, while the torque limit indicated in the rate-based torque limit graph 620 is positive, some torque may be delivered, and when the torque limit is not positive, no torque may be delivered, and braking may be induced (e.g., to avert an impact between the vehicle and the lead vehicle). A dashed line 624 indicates an example closing rate at which the closing rate-based torque limit may be applied, where the torque limit is indicated by point 626 of line 622. Thus, a first potential torque limit that may be selected to apply to the final driver demand is the closing rate-based torque limit indicated at point 626 of the closing rate-based torque limit graph 620. The first potential torque limit is indicated in the final driver demand graph 602 by a line 612.

Similarly, the following distance-based torque limit may be calculated in accordance with a following distance-based torque limit graph 630, with a following distance to the target lead vehicle depicted along a horizontal axis and a torque limit to be applied depicted along a vertical axis. A following distance-based torque limit may be applied to the torque request of the final driver demand based on a following distance. The following distance-based torque limit graph 630 includes an example torque line 632 that shows the distance-based torque limit as a function of the following distance. Line 632 is nonlinear, where as the following distance decreases, the distance-based torque limit decreases, until reaching a point 638 on torque line 632 where the distance-based torque limit reaches zero (e.g., where no torque is delivered, as described above). If the distance-based torque limit becomes negative, no torque may be delivered, and the one or more brakes of the vehicle may be applied to reduce the velocity of the vehicle. A dashed line 634 indicates an example following distance at which the following distance-based torque limit is applied, indicated by point 636 of line 632. Thus, a second potential torque limit that may be selected to apply to the final driver demand is the following distance-based torque limit indicated at point 636 of the following distance-based torque limit graph 630. The torque limit corresponding to the second potential torque limit is indicated in the final driver demand graph 602 by a line 608.

The driver demand-based torque limit may be calculated in accordance with a driver demand-based torque limit graph 640, with an accelerator pedal position depicted as a percentage along a horizontal axis and a torque limit to be applied depicted along a vertical axis The driver demand-based torque limit graph 640 includes an example torque line 642 that shows torque request as a function of the accelerator pedal position. While line 642 is a straight line indicating a linear relationship between driver demand and a corresponding torque request, where as the pedal position percentage increases, the corresponding torque request increases in direct proportion to the pedal position, in other examples the line 642 may not be a straight line and may indicate a nonlinear relationship between driver demand and a corresponding torque request. A dashed line 644 indicates an example pedal position at which an example the driver demand-based torque limit is applied, indicated by point 646 of line 642. Thus, a third potential torque limit that may be selected to apply to the final driver demand is the driver demand-based torque limit indicated at point 646 of the driver demand-based torque limit graph 640. The torque limit corresponding to the third potential torque limit is indicated in the final driver demand graph 602 by a line 610.

The mode-based absolute torque limit may be calculated in accordance with a mode-based absolute torque limit graph 650, with a mode of the vehicle depicted on a horizontal axis and a torque request to be applied to generate the limit depicted along a vertical axis. Depending on the mode of the vehicle, (e.g., normal mode, transition mode, or tailgating mode) the mode-based absolute torque limit may be applied to the torque request of the final driver demand. In the mode-based absolute torque limit graph 650, a single torque limit is depicted based on the tailgating mode (e.g., the mode to which the assistive action 600 applies). The tailgating mode is depicted by a dashed line 654, and an example torque line 652 shows the mode-based absolute torque limit to be applied for the tailgating mode, indicated by point 656 of line 652. Thus, a fourth potential torque limit that may be selected to apply to the final driver demand is the mode-based absolute torque limit indicated at point 656 of the mode-based absolute torque limit graph 650. The fourth potential torque limit is indicated in the final driver demand graph 602 by a line 606.

Returning to the final driver demand graph 602, four torque limit options are shown: the first potential torque limit indicated by the dashed line 612, based on the closing rate; the second potential torque limit indicated by the dashed line 608, based on the following distance; the third potential torque limit indicated by the dashed line 610, based on the driver demand; and the fourth potential torque limit indicated by the dashed line 606, a mode-based absolute torque limit. When a torque limit of the four torque limit options is applied, no further torque is delivered above the torque limit, even if higher torque is requested. In one example, the lowest torque limit is applied. One of the closing rate-based torque limit, the following distance-based torque limit, the driver demand-based torque limit, and the mode-based absolute torque limit may be selected and applied to the torque request in accordance with the assistive action algorithm 600. In one example, the assistive action algorithm 600 selects and applies a lowest torque limit of the closing rate-based torque limit, the following distance-based torque limit, the driver demand-based torque limit, and the mode-based absolute torque limit. In the final driver demand graph 602, the lowest torque limit corresponds to the torque request indicated by dashed line 612, the closing rate-based limit.

For example, the driver may accelerate and close the following distance to the target lead vehicle. At a moment in time represented by graph 602, one of the four torque limit options may be applied to a torque requested by the driver. A driver demand-based torque limit f indicated by the intersection of line 610 and the vertical axis shows that no more torque is delivered than what is demanded by the driver. A following distance-based torque limit g indicated by the intersection of line 608 and the vertical axis and a mode-based absolute torque limit h indicated by the intersection of line 606 and the vertical axis represent torque limits above the driver demand for torque, where the following distance-based torque limit g and the mode-based absolute torque limit h are not applied. However, a closing rate-based torque limit e indicated by the intersection of line 612 and the vertical axis shows a torque limit below the driver demand for torque, where the closing rate-based torque limit e may be applied to the driver demand for torque.

In other examples, the assistive action algorithm 600 does not select and apply the lowest torque limit of the closing rate-based torque limit, the following distance-based torque limit, the driver demand-based torque limit, and the mode-based absolute torque limit, and the assistive action algorithm 600 selects and applies a different torque limit based on a logic of the assistive action algorithm 600. For example, a decision regarding which torque limit to apply may depend on an assessment of a relative importance of a torque limit in comparison with other potential torque limits to apply. For example, under certain conditions, the closing rate-based torque limit e is not applied to the driver demand for torque, and the higher driver demand-based torque limit f is applied to the driver demand for torque.

In FIG. 7, an exemplary method 700 shows a procedure for determining whether or not to apply an assistive action to a driver of a vehicle to adjust a driver demand for torque when the vehicle is in one or more threshold following distances of a target lead vehicle (e.g., when the vehicle is in or approaching a tailgating scenario). As described herein, applying the assistive action may include calculating and applying a driver demand adjustment to a base driver demand for torque to generate a final driver demand for torque (e.g., the base driver demand and final driver demand of FIGS. 4A-4E). Instructions for carrying out method 700 and the rest of the methods included herein may be executed by a controller of the vehicle, and more specifically, by a processor of the controller of the vehicle based on instructions stored on a memory of the controller, in conjunction with signals received from sensors of the engine system (e.g., the processor 204, memory 206, and sensors 208 of control system 200 described above in reference to FIG. 2).

As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the figure. Similarly, one or more steps or functions may be repeatedly performed, although not explicitly illustrated. In one embodiment, the functions illustrated are primarily implemented by software, instructions, or code stored in a computer readable storage medium and executed by one or more microprocessor-based computers or controllers to control operation of the vehicle.

As illustrated by examples herein, the method of operating and performing actions responsive to a determination of a condition may include operating in that condition (e.g., operating the vehicle in a lane of a road behind a target lead vehicle within a threshold following distance of the one or more threshold following distances), determining whether that condition is present (such as based on sensor output, e.g., estimating that the following distance is less than the threshold following distance) and performing actions in response thereto, as well as operating without that condition present, determining that the condition is not present, and performing a different action in response thereto.

At 702, method 700 includes estimating and/or measuring vehicle operating conditions. Vehicle operating conditions may be estimated based on one or more outputs of various sensors of the vehicle (e.g., such as oil temperature sensors, engine velocity or wheel velocity sensors, torque sensors, etc., as described above in reference to vehicle 5 of FIG. 1). Vehicle operating conditions may include engine velocity and load, vehicle velocity, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor velocity, battery charge, engine torque output, vehicle wheel torque, etc. Estimating and/or measuring vehicle operating conditions may include determining whether the vehicle is being powered by an engine or an electric motor (e.g., the engine 10 or the electric machine 120 of vehicle 5 of FIG. 1).

At 704, method 700 includes determining whether an assistive action system of the vehicle is enabled. In one example, the assistive action system of the vehicle is automatically enabled and cannot be disabled by the driver. In other examples, the assistive action system of the vehicle may not be automatically enabled and may be disabled by the driver, or the assistive action system of the vehicle may not automatically be enabled and may be enabled and/or disabled by the driver. If the assistive action system of the vehicle is not enabled at 704, method 700 proceeds to 714. At 714, method 700 includes continuing vehicle operation. In some examples, continuing vehicle operation at 714 may include, at 715, continuing to deliver driver demanded torque as requested by an operator of the vehicle (e.g., in response to changes in accelerator pedal input as input by the operator), without adjusting the torque based on a following distance to a lead vehicle. In other examples, as indicated at 717, continuing vehicle operation may include, when the vehicle is currently operating in an adaptive cruise control mode, continuing vehicle operation in the adaptive cruise control mode. If the vehicle is not in an adaptive cruise control mode, whereby the driver demand for torque is generated via the accelerator pedal, the assistive action may be applied and/or the assistive action system may be enabled. In the adaptive cruise control mode, the vehicle may automatically adjust a velocity of the vehicle based on factors that may include a following distance behind a target lead vehicle (e.g., decrease the velocity of the vehicle if one or more threshold cruise control following distances are exceeded). In the adaptive cruise control mode, a demand for torque is generated by a controller of the vehicle, and a driver demand for torque is not generated via a pedal position of an accelerator pedal of the vehicle. As there is no driver demand for torque, the assistive action may not be applied or the assistive action system may be disabled.

If the assistive action system of the vehicle is enabled at 704, method 700 proceeds to 706. At 706, method 700 includes determining whether a moving target ahead of the vehicle has been detected (e.g, the target lead vehicle of FIGS. 3A, 3B, 3C). Determining whether the moving target ahead of the vehicle has been detected may include detecting the moving target via one or more external sensors mounted on a front and of the vehicle (e.g., the external front-end sensors 220 of control system 200 of FIG. 2). For example, the one or more external sensors may include one or more cameras, ultrasonic sensors, and/or electromagnetic sensors. If it is determined at 706 that no moving target ahead of the vehicle is identified, method 700 proceeds to 714, where vehicle operation is continued under manual operation and without any assistive actions. If a moving target ahead of the vehicle is detected at 706, method 700 proceeds to 708. At 708, method 700 includes estimating a following distance to the moving target ahead of the vehicle. Estimating the following distance to the moving target ahead of the vehicle may include estimating a distance between the vehicle and the moving target ahead of the vehicle based on one or more external sensors mounted on a front and of the vehicle, as described in greater detail below in reference to FIG. 8.

At 709, method 700 includes calculating a first threshold following distance and a second threshold following distance between the vehicle and the moving target ahead of the vehicle, where the first threshold following distance is greater than the second threshold following distance. The first threshold following distance may be the same as or similar to the first threshold following distance indicated by dotted line 330 of FIGS. 3A-3C, and the second threshold following distance may be the same as or similar to the second threshold following distance indicated by dotted line 328 of FIGS. 3A-3C. In some examples, the first and second threshold following distances may be the same as or similar to one or more of the adaptive cruise control threshold following distances, while in other examples, the first and second threshold following distances may be different from the adaptive cruise control threshold following distances. Calculation of the first threshold distance and the second threshold distance is described in greater detail below in relation to FIG. 8.

At 710, method 700 includes receiving a driver demand for torque. In one example, the driver demand for torque is received as a signal from an accelerator pedal position sensor, responsive to the driver pressing the accelerator pedal. For example, the driver may apply a modest pressure to the accelerator pedal, which may generate a signal indicating a modest driver demand for torque, or the driver may apply a greater pressure to the accelerator pedal, which may generate a signal indicating a greater driver demand for torque. In some examples, the driver may press the accelerator pedal to a maximum pedal position (e.g., to a floor of the vehicle), which may generate a signal indicating a maximum driver demand for torque.

At 712, method 700 includes determining whether the following distance calculated at 708 is less than the first threshold following distance calculated at 709. If at 712 it is determined that the following distance is not less than the first threshold following distance, method 700 proceeds to 714, where vehicle operation is continued under manual operation and without any assistive actions. If at 712 it is determined that the following distance is less than the first threshold following distance (e.g., within the first threshold following distance), method 700 proceeds to 716. At 716, method 700 includes calculating and applying a first driver demand adjustment (e.g., a moderate driver demand adjustment). An example procedure for calculating and applying the first driver demand adjustment is described in reference to FIG. 9.

At 718, method 700 includes determining whether the following distance of the vehicle is less than the second threshold following distance. If at 718 it is determined that the following distance is less than the second threshold following distance (e.g., within a tailgating range, e.g., within the second following distance threshold indicated by dashed line 328 of FIGS. 3A-3C), method 700 proceeds to 720. At 720, at 700 includes calculating and applying a second driver demand adjustment (e.g., the second driver demand adjustment in accordance with the assistive action algorithm 600 of FIG. 6). In some examples, the second driver demand adjustment may be a more aggressive driver demand adjustment than the first driver demand adjustment. An example procedure for calculating and applying the second driver demand adjustment is discussed in greater detail below in reference to FIG. 10.

If at 718 it is determined that the following distance is not less than the second threshold following distance, method 700 proceeds to 722. At 722, method 700 includes alerting the driver of the first and/or second driver demand adjustment applied, in the case that notifications are enabled by the driver. In one example, alerting the driver of the first and/or second driver demand adjustment includes illuminating a light on a dashboard of the vehicle. In other examples, other methods may be used to alert the driver of the first and/or second driver demand adjustment, such as displaying a textual notification on a screen of an onboard computer system, or by emitting an audio notification, etc.

For example, the driver may initiate the driver demand for torque of the engine by pressing the accelerator pedal. In a first scenario, the following distance of the following vehicle (e.g., a distance from the target lead vehicle) is greater than the first threshold following distance. In response to the following distance of the following vehicle being greater than the first threshold following distance, a controller of the vehicle may not make an adjustment to the driver demand for torque, whereby an assistive action is not applied to the driver demand for torque. In a second scenario, the following distance of the following vehicle is less than the first threshold following distance. In response to the following distance of the following vehicle being less than the first threshold following distance, the controller may make an adjustment to the driver demand for torque, whereby the driver demand for torque is adjusted down in accordance with the example procedure described below in relation to FIG. 9. In a third scenario, the following distance of the following vehicle is less than the first threshold following distance and less than the second threshold following distance, whereby the vehicle may be tailgating. In response to the following distance of the following vehicle being less than the first threshold following distance and less than the second threshold following distance, the controller may make an additional adjustment to the driver demand for torque, whereby the driver demand for torque is further adjusted down by applying a torque limit calculated in accordance with the example procedure described below in relation to FIG. 10.

Figure 8:
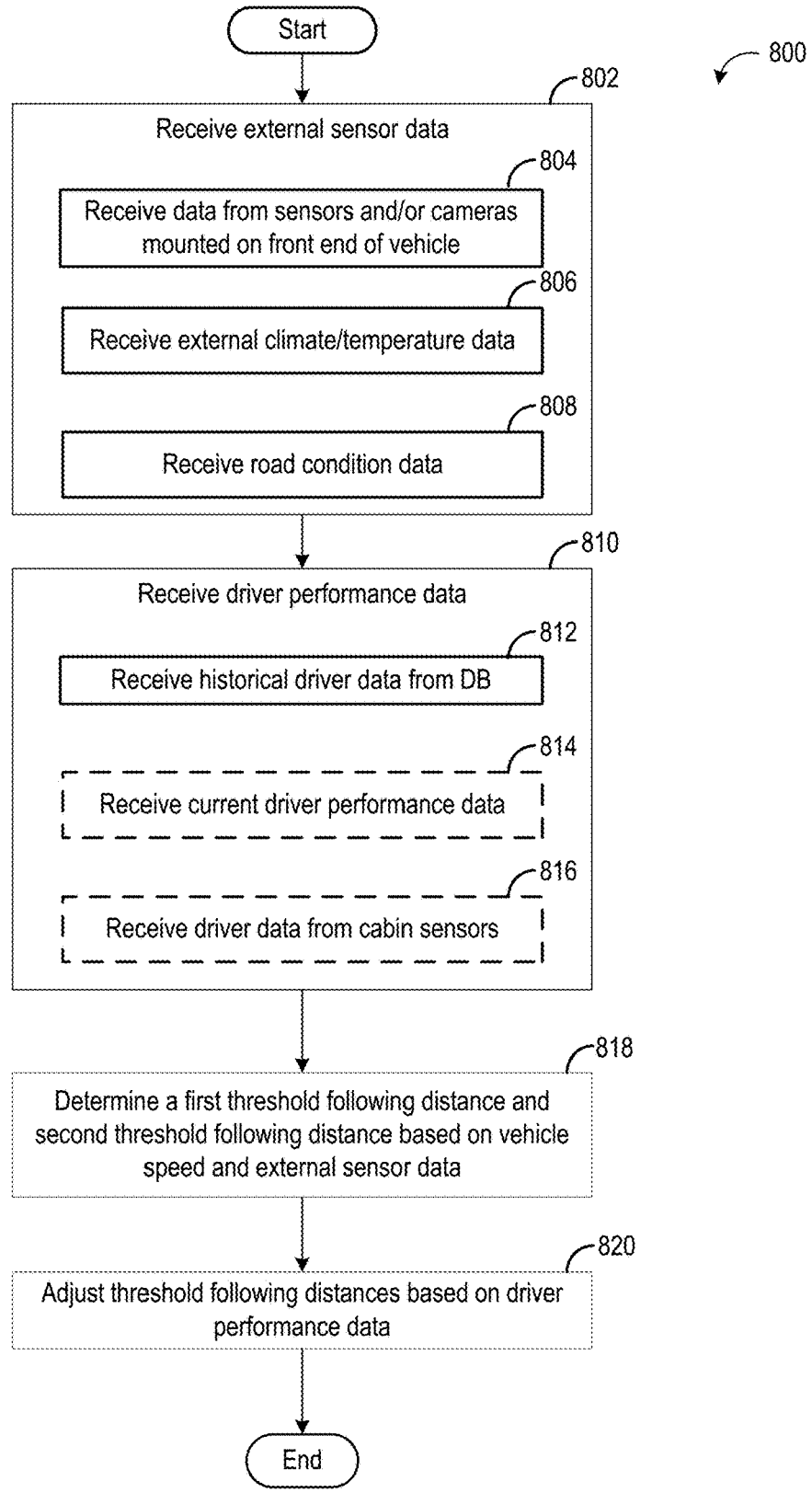
FIG. 8 shows a flow chart illustrating an example method for determining one or more following distance thresholds of a vehicle.

Referring now to FIG. 8, an exemplary method 800 shows a procedure for calculating a first threshold following distance and a second threshold following distance of a vehicle following a target lead vehicle on a road. Method 800 may be applied as part of method 700 described above, to provide an assistive action to the vehicle to adjust a driver demand for torque when the vehicle is in or approaching a tailgating scenario.

At 802, method 800 includes receiving external sensor data of the vehicle. At 804, receiving external sensor data of the vehicle includes receiving data from one or more sensors and/or cameras mounted on a front end of the vehicle (e.g., the external front-end sensors 130 of FIG. 2). As described above in relation to FIG. 2, the external front-end sensors may include, as a non-limiting list of examples, ultrasound sensors, electromagnetic sensors, external cameras, lidar, radar, or any other type of proximity sensors.

For example, a sonar (e.g., ultrasound) or laser-based sensor may be used to transmit a sound or light wave from the vehicle to a moving target ahead of the vehicle (e.g., a target lead vehicle), and measure a time between transmitting the sound or light wave from the vehicle and receiving a reflected sound or light wave back from the moving target. Based on the time, a following distance between the vehicle and the moving target may be estimated.

Similarly, a camera mounted on the front end of the vehicle may acquire one or more images of the road ahead of the vehicle. The one or more images acquired by the one or more cameras may include images of the moving target ahead of the vehicle. In a first example, the moving target ahead of the vehicle may occupy a relatively large portion of the one or more images, indicating that the moving target ahead of the vehicle is close to the vehicle. In a second example, the moving target ahead of the vehicle may occupy a relatively small portion of the one or more images, indicating that the moving target ahead of the vehicle is not close to the vehicle. Based on a size of the moving target in the one or more images, a controller of the vehicle (e.g., the controller 12 of control system 200 of FIG. 2) may estimate a following distance between the vehicle and the moving target ahead of the vehicle. In some examples, established triangulation techniques may be used between sensors mounted on a left side of a front end of the vehicle and a right side of the front end (e.g., a stereo pair of cameras, etc.).

At 806, receiving external sensor data of the vehicle includes receiving external climate and/or temperature data from an environment through which the vehicle is traveling. For example, the vehicle may be traveling during the winter, when an external temperature is low, or the vehicle may be traveling during the summer, when the external temperature is high. If the external temperature is low (e.g., below freezing), patches of snow and/or ice may exist on the road, creating a hazardous condition which may impact a safety of the following distance of the vehicle. Additionally, the vehicle may be traveling under weather conditions, for example, in rain or snow, which may further impact the safety of the following distance of the vehicle. At 808, receiving external sensor data of the vehicle includes receiving road condition data. For example, the road that the vehicle is traveling on a be a new road with a smooth, consistent surface, or the road that the vehicle is traveling on may be an older road, with a less consistent, less smooth surface. The road may be an unpaved road, or a paved road with frequent potholes. The road may have dust, snow, or other particles and/or debris which may increase a safe following distance of the vehicle, or the road may be clear of dust, snow, or other particles and/or debris, which may decrease the safe following distance of the vehicle. In one example, a condition of the road may be estimated based on data received from one or more cameras of the vehicle, which may acquire images that may be analyzed to detect pavement, potholes, dust, etc. In other examples, the condition of the road may be estimated based on data received from sensors of an active suspension system of the vehicle, one or more wheels of the vehicle, vibration sensors, and so forth. It should be appreciated that the examples provided herein are for illustrative purposes and other types of sensors may be used to estimate environmental and/or road conditions and/or distances between the vehicle and a moving target ahead of the vehicle without departing from the scope of this disclosure.

At 810, method 800 includes receiving driver performance data. In one example, driver performance data may be used to calibrate estimates of one or more safe following distances based on a skill and/or experience of a driver of the vehicle. At 812, receiving driver performance data includes receiving historical driver data from a driver database in memory accessible by the controller of the vehicle (e.g., the memory 206 of controller 12 of control system 200 of FIG. 2). For example, the historical driver data of the driver may include a number of hours of operation of the vehicle, including a number of hours of operation of the vehicle under different conditions (e.g., daytime versus nighttime, winter driving versus summer driving, etc.). The historical driver data of the driver may include one or more ratings or characterizations of the driver with respect to driving style, typical acceleration and/or braking patterns, brake scores, etc. At 814, receiving driver data includes receiving current driver performance data. In one example, the controller may receive data from vehicle sensors (e.g., the vehicle sensors 208 of control system 200 of FIG. 2) such as a pedal position sensor, a wheel sensor an engine sensor, and/or a brake pedal sensor, which may be used to estimate current acceleration and/or braking patterns of the driver. For example, the driver may be driving in an erratic manner characterized by bursts of acceleration followed by braking events (e.g., if the driver is upset), or the driver may be driving in a manner characterized by smooth, cautious accelerations with few braking events (e.g., if the driver is relaxed). At 816, receiving driver data includes receiving current driver data from in-cabin sensors. For example, a level of energy, alertness, and/or anxiety of the driver may be estimated from driver facial image data acquired by a dashboard cam or other in-cabin camera.

At 818, method 800 includes calculating a first threshold following distance and a second threshold following distance based on vehicle speed and the external sensor data, where if the vehicle is inside the first threshold following distance (e.g., in a transition mode), the vehicle may be at risk of tailgating, and if the vehicle is inside the first threshold following distance and inside the second threshold following distance (e.g., in a tailgating mode), the vehicle may be at a risk of not being able to stop in time to avoid an impact with the target lead vehicle in the event of a sudden brake event initiated by the target lead vehicle. In one example, the second threshold following distance is calculated based on a wheel base of the vehicle, a vehicle speed, and a following factor, via the formula:

$$STFD=WB*VSPD*FF$$

Where STFD is the second threshold following distance, WB is a wheel base of the vehicle, VSPD is the vehicle speed, and FF is the following factor. The following factor may be fixed or configurable, and/or it may have additional dependencies. For example, the following factor may be increased by a payload of the vehicle, a grade of a road the vehicle is traveling on, or a condition of the road (e.g., due to rain, snow, etc.)

The first threshold following distance may be calculated based on the second threshold following distance. In one example, the first threshold following distance may be a multiple of the second threshold following distance, such as a distance equal to three times the second threshold following distance. For example, if the first threshold following distance is 20 feet, the second threshold following distance may be 60 feet. In another example, the first threshold following distance is calculated based on the second threshold following distance and a transition range ratio, via the formula:

$$FTFD=STFD+(STFD*TRR)$$

Where FTFD is the first threshold following distance, STFD is the second threshold following distance, and TRR is the transition range ratio (e.g., a predetermined ratio of the first threshold following distance to the second threshold following distance.

In other examples, calculating the first threshold following distance and the second threshold following distance based on vehicle speed and the external sensor data may include estimating a reaction time distance of the driver, where the reaction time distance of the driver is an amount of distance covered by the vehicle over a time taken by the driver to react to a sudden brake event initiated by the target lead vehicle. For example, if the target lead vehicle initiates a brake event and it takes the driver 1 second to react to the brake event (e.g., by pressing a brake of the vehicle), then the reaction time distance is an amount of distance the vehicle travels in 1 second based on the vehicle speed (e.g., if the vehicle is traveling at 60 mph, the reaction time distance may be 85 feet). In one example, the second threshold following distance may be the reaction time distance. In another example, the second threshold following distance may be a percentage of the reaction time distance based on an estimated threshold decrease in velocity of the target lead vehicle after a brake event. For example, if it is estimated that the target lead vehicle is unlikely to initiate a brake event that decreases a velocity of the target lead vehicle more than 30%, the second threshold following distance may be 30% of the reaction time distance.

Additionally, the reaction time distance may be adjusted based on a stopping distance of the vehicle based on road condition and/or environmental condition from a lookup table stored in a memory of a controller of the vehicle (e.g., the memory 206 of the controller 12 of FIG. 2). For example, a manufacturer of the vehicle may have defined a first stopping distance for the vehicle traveling at a speed on a road in good condition in hot weather, a second stopping distance for the vehicle traveling at the speed on a road in poor condition in hot weather, a third stopping distance for the vehicle traveling at the speed on a road in good condition in cold weather, a fourth stopping distance for the vehicle traveling at the speed on an unpaved road, and so forth. In other examples, calculating the first threshold following distance and the second threshold following distance based on vehicle speed and the external sensor data may include determining a baseline stopping distance of the vehicle based on a historical driver performance of the vehicle. The baseline stopping distance may be used to adjust the reaction time distance of the driver, where, for example, the reaction time distance of the driver may be increased if road conditions or weather conditions are poor.

At 820, method 800 includes adjusting the first threshold following distance and the second threshold following distance based on the driver performance data received at 810. For example, if the driver is inexperienced or has a driving style characterized by aggressive driving, rapid accelerations, and/or sudden braking events, the first threshold following distance and/or the second threshold following distance may be adjusted such that the first threshold following distance and/or the second threshold following distance is increased, thereby providing an additional margin of error/safety for the driver in the event of a sudden brake event initiated by the target lead vehicle. Alternatively, if the driver is an experienced driver or has a driving style that is not characterized by aggressive or sudden behaviors, the first threshold following distance and/or the second threshold following distance may not be adjusted to provide an additional margin of error/safety for the driver. Further, the first threshold following distance may be adjusted based on driver performance data, and the second threshold following distance may not be adjusted based on driver performance data, or the second threshold following distance may be adjusted based on driver performance data, and the first threshold following distance may not be adjusted based on driver performance data.

Figure 9:
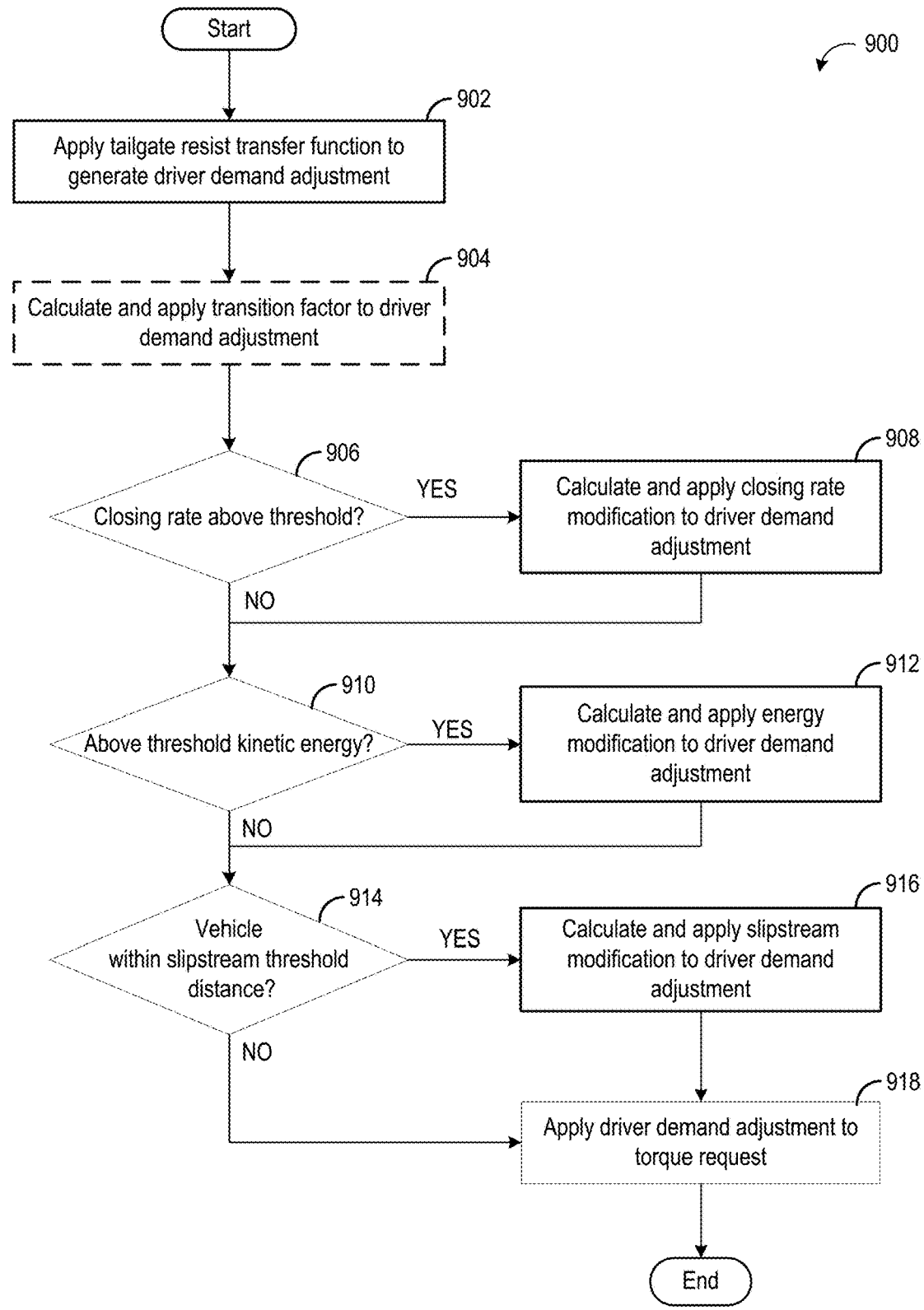
FIG. 9 shows a flow chart illustrating an example method for calculating and applying a first adjustment to driver demand for torque.

Referring now to FIG. 9, an exemplary method 900 shows a procedure for calculating and applying a first driver demand adjustment to a base driver demand for torque of a vehicle (e.g., as communicated by the driver via an accelerator pedal) to produce a final driver demand for torque (e.g., based on a following distance between the vehicle and a target lead vehicle traveling on a road ahead of the vehicle). Method 900 may be applied as part of method 700 described above, to provide an assistive action to the vehicle to adjust a demand for torque as the vehicle closes the following distance. The first driver demand adjustment to the base driver demand for torque may be a moderate driver demand adjustment applied in a situation where the vehicle is operating in a tailgating mode or a transition mode.

At 902, method 900 includes applying a tailgate resist transfer function to the driver demand for torque. The tailgate resist transfer function may be the same as or similar to the tailgate resist transfer function 404 of FIG. 4A. As described above, the tailgate resist transfer function may be a non-linear function that outputs a first driver demand adjustment in the form of a torque reduction based on an accelerator pedal position. In one example, the first driver demand adjustment increases a perceived resistance of the vehicle to the driver demand for torque up to a threshold accelerator pedal position, and decreases the perceived resistance of the vehicle to the driver demand for torque to zero as the accelerator pedal position increases from the threshold accelerator pedal position to a maximum pedal position. In this way, the first driver demand adjustment is smallest at an initiation of an acceleration and at an end of the acceleration, and greatest in the middle of the acceleration. As a result, the driver may initially perceive the vehicle as being less responsive to the driver demand for torque, until the accelerator pedal position approaches a maximum pedal position where the first driver demand adjustment is a torque reduction of zero (e.g., no driver demand adjustment is applied to the driver demand for torque).

At 904, method 900 includes calculating and applying a transition factor to the driver demand adjustment. The transition factor may be the same as or similar to the transition factor 422 described above in relation to FIG. 4B. As described above, the transition factor may be a weighting applied to the driver demand adjustment generated at 902 when the vehicle is operating in a transition mode. For example, the transition factor may be a number between 0 and 1 based on the following distance of the vehicle, where if the vehicle is close to the target lead vehicle, the transition factor may be higher, and if the vehicle is farther from the target lead vehicle, the transition factor may be lower. Thus, as the following distance of the vehicle increases, the transition factor may decrease, whereby the first driver demand adjustment is reduced. In this way, the transition factor may allow the first driver demand adjustment to decay gradually when operating in the transition mode, between operation in the tailgating mode where the first driver demand adjustment is highest and operation in a normal mode where the first driver demand adjustment decreases to zero.

At 906, method 900 includes determining whether a closing rate of the vehicle is above a threshold closing rate, where the closing rate of the vehicle is a rate at which the following distance is decreasing as a result of the acceleration of the vehicle. For example, the closing rate may be high, where the following distance is decreasing rapidly, or the closing may be low, where the following distance is not decreasing rapidly. Further, the closing rate may be negative, where the following distance is increasing (e.g., as a result of a negative acceleration of the vehicle). The threshold closing rate may be a closing rate that will decrease the following distance of the vehicle to a point at which the vehicle may not be able to avert an impact with the target lead vehicle in the event of a sudden brake event.

If at 906 is determined that the closing rate of the vehicle is above the threshold closing rate, method 900 proceeds to 908. At 908, method 900 includes calculating and applying a closing rate modification to the driver demand adjustment, after which method 900 proceeds to 910. The closing rate modification may be the same as or similar to the closing rate modification described above in reference to the closing rate modification graph 432 of FIG. 4C. For example, the closing rate modification may comprise an additional torque reduction to the driver demand adjustment based on the closing rate of the vehicle.

If at 906 at is determined that the closing rate of the vehicle is not above the threshold closing rate, method 900 proceeds to 910. At 910, method 900 includes determining whether an amount of kinetic energy of the vehicle is below a threshold amount of kinetic energy. In one example, the amount of kinetic energy of the vehicle is estimated by a controller of the vehicle based on factors including grade, vehicle speed, payload, trailer weight, etc. For example, if the vehicle is a vehicle with a heavy payload traveling down a grade at a high speed, the amount of kinetic energy of the vehicle may be high. If the vehicle is a light vehicle traveling on a flat road, the amount of kinetic energy of the vehicle may be low. In one example, the threshold amount of kinetic energy is an amount of kinetic energy above which an additional buffer of following distance is advisable to reflect an additional amount of time and/or energy used to reduce a velocity of the vehicle.

If at 910 it is determined that the amount of kinetic energy of the vehicle is above the threshold amount of kinetic energy, method 900 proceeds to 912. At 912, method 900 includes calculating and applying an energy modification to the driver demand adjustment, after which method 900 proceeds to 914. The energy modification may be the same as or similar to the energy modification described above in reference to the energy modification graph 442 of FIG. 4, where the energy modification may comprise an additional torque reduction to the driver demand adjustment based on the amount of kinetic energy of the vehicle. As described above, the energy modification may be a torque reduction to be applied as a linear function of kinetic energy.

If at 910 it is determined that the amount of kinetic energy of the vehicle is not above the threshold amount of kinetic energy, method 900 proceeds to 914. At 914, method 900 includes determining whether the vehicle is within a threshold slipstream distance. For example, the threshold slipstream distance may be a following distance between the vehicle and a target lead vehicle at which an air resistance around the vehicle decreases due to a slipstream effect caused by air passing around the target lead vehicle, whereby a vacuum may be caused behind the target lead vehicle that may draw the vehicle towards the target lead vehicle. The threshold slipstream distance may also be influenced by factors such as a shape and/or prominence (e.g., height and width) of the vehicle, or an amount and/or direction of wind in an environment around the vehicle. For example, the threshold slipstream distance may be greater if the target lead vehicle is a large vehicle such as a truck, or the threshold slipstream distance may be reduced if the vehicle is traveling in the direction of the wind. If the vehicle is drawn towards the target lead vehicle as a result of the slipstream effect, a velocity of the vehicle may increase, thereby narrowing the following distance of the vehicle. If at 914 it is determined that the vehicle is within the threshold slipstream distance, method 900 proceeds to 916. At 916, method 900 includes calculating and applying a slipstream modification to the driver demand adjustment. The slipstream modification may be the same as or similar to the slipstream modification described above in reference to the slipstream modification graph 452 of FIG. 4E, where the slipstream modification may comprise an additional torque reduction to the driver demand adjustment based on the following distance and/or other slipstream factors of the vehicle. In one example, the slipstream modification is a torque reduction to be applied as a linear function of the following distance of the vehicle.

If at 914 it is determined that the vehicle is not within the threshold slipstream distance, method 900 proceeds to 918. At 918, method 900 includes applying the driver demand adjustment to the torque request.

Figure 10:
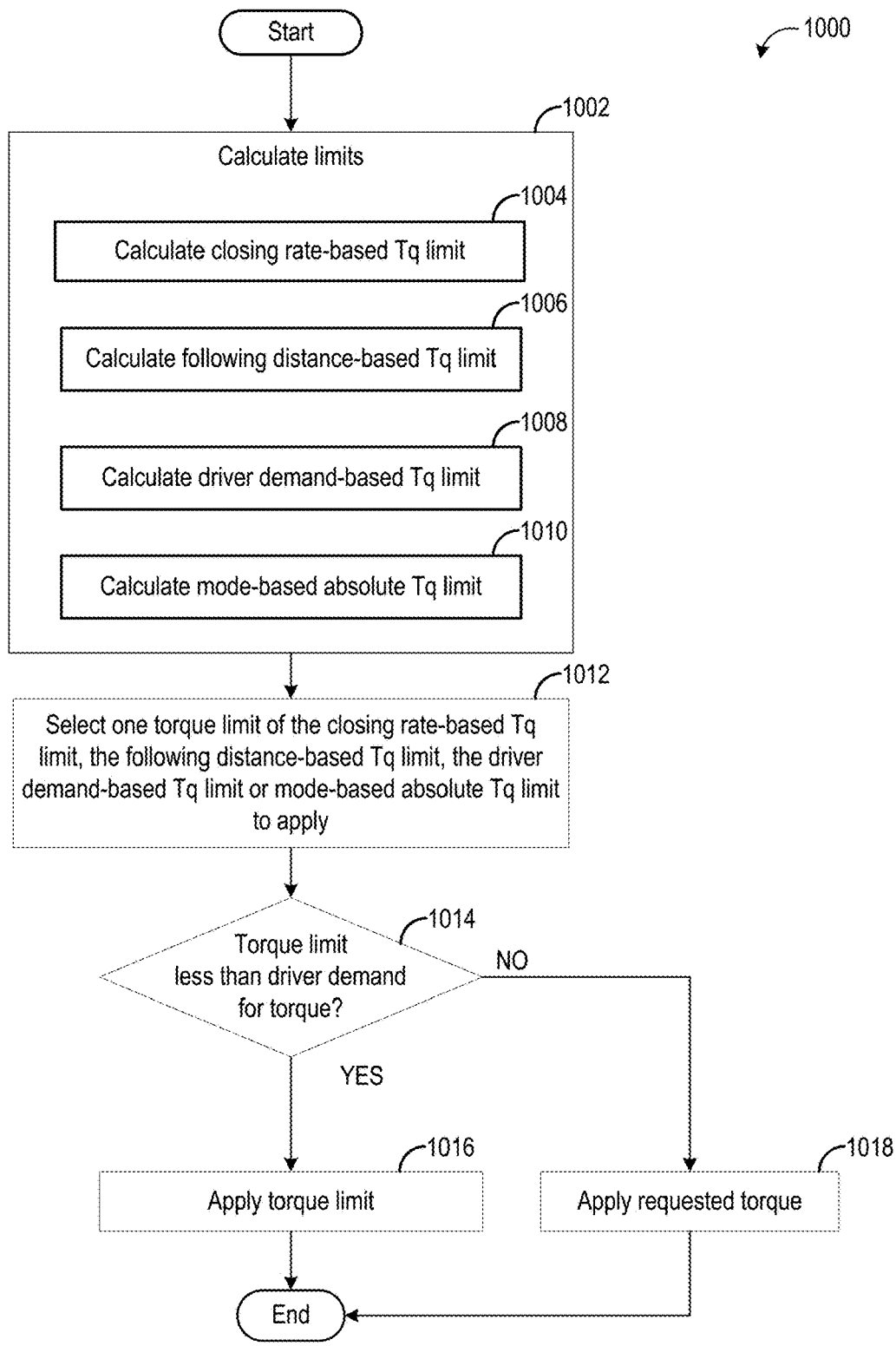
FIG. 10 shows a flow chart illustrating an example method for calculating and applying a second adjustment to driver demand for torque.

Referring now to FIG. 10, an exemplary method 1000 shows a procedure for calculating and applying a second driver demand adjustment to a final driver demand for torque of a vehicle (e.g., as communicated by the driver via an accelerator pedal, and as modified by the first driver demand adjustment) to produce a new final driver demand for torque (e.g., based on a following distance between the vehicle and a target lead vehicle traveling on a road ahead of the vehicle). Method 1000 may be applied as part of method 700 described above, to provide an assistive action to the vehicle to adjust a demand for torque as the vehicle closes the following distance, in accordance with an assistive action algorithm such as the assistive action algorithm 600 of FIG. 6. The second driver demand adjustment to the base driver demand for torque may be an aggressive driver demand adjustment applied in a situation where there may be a high risk that the vehicle may not be able to avert an impact in the event of a sudden brake event by the target lead vehicle. In one example, the second driver demand adjustment is applied to the final driver demand for torque after the first driver demand adjustment is applied to the final driver demand for torque, and the second driver demand adjustment is a torque limit applied to the final driver demand for torque, whereby no additional torque is requested beyond the torque limit applied.

At 1002, method 1000 includes calculating one or more torque limits that may be applied to the final driver demand for torque. As described above in relation to FIG. 6, a torque limit to be applied to the final driver demand for torque may be selected from the one or more torque limits. At 1004, calculating the one or more torque limits that may be applied to the final driver demand for torque includes calculating a closing rate-based torque limit. The closing rate-based torque limit may be the same as or similar to the closing rate-based torque limit described above in reference to the closing rate based torque limit graph 620 of FIG. 6. The closing rate-based torque limit may be determined from a lookup table based on a velocity of the vehicle relative to a velocity of the lead target vehicle, where the closing rate-based torque limit is a first maximum amount of torque that may be applied to the vehicle based on a predetermined closing rate-based torque limit function.

At 1006, calculating the one or more torque limits that may be applied to the final driver demand for torque includes calculating a following distance-based torque limit. The following distance-based torque limit may be the same as or similar to the following distance-based torque limit described above in reference to the following distance-based torque limit graph 630 of FIG. 6. The following distance-based torque limit may be determined from a lookup table based on the following distance of the vehicle, where the following distance-based torque limit is a second maximum amount of torque to be applied to the vehicle based on a predetermined following distance-based torque limit function.

At 1008, calculating the one or more torque limits that may be applied to the final driver demand for torque includes calculating a driver demand-based torque limit. The driver demand-based torque limit may be the same as or similar to the driver demand-based torque limit described above in reference to the driver demand-based torque limit graph 640 of FIG. 6. The driver demand-based torque limit may be determined from a lookup table based on the driver demand for torque, where the driver demand-based torque limit is an amount of torque to apply for an accelerator pedal position of the vehicle based on a predetermined driver demand-based torque limit function.

At 1010, calculating the one or more torque limits that may be applied to the final driver demand for torque includes calculating a mode-based absolute torque limit. The mode-based absolute torque limit may be the same as or similar to the mode-based absolute torque limit described above in reference to the mode-based absolute torque graph 640 of FIG. 6. The mode-based absolute torque limit may be determined from a lookup table based on a mode of operation of the vehicle (e.g., normal mode, transition mode, or tailgating mode), where the mode-based absolute torque limit is a predetermined third maximum amount of torque to apply based on the operating mode. For example, a first mode-based absolute torque limit may be applied if the vehicle is operating in the normal mode, a second mode-based absolute torque limit may be applied if the vehicle is operating in the transition mode, and a third mode-based absolute torque limit may be applied if the vehicle is operating in the tailgating mode.

At 1012, method 1000 includes selecting a torque limit to apply of the closing rate-based torque limit, the following distance-based torque limit, the driver demand-based torque limit, and the mode-based absolute torque limit. In one example, the torque limit applied is the lesser of the rate-based torque limit, the driver demand torque limit, the absolute distance torque limit, and the mode-based absolute torque limit (e.g., the lowest torque limit, or the first torque limit that is reached as a result of an increasing accelerator pedal position). In other examples, a different torque limit than the lowest torque limit may be applied, based on a logic of the assistive action algorithm.

At 1014, method 1000 includes determining whether the torque limit selected at 1012 is less than the driver demand for torque. If at 1014 it is determined that the torque limit to be applied is not less than (e.g., the torque limit is greater than) the driver demand for torque, method 1000 proceeds to 1018. At 1018, method 1000 includes applying the driver demand for torque as the torque limit. Alternatively, if at 1014 it is determined that the torque limit to be applied is less than the driver demand for torque, method 1000 proceeds to 1016. At 1016, method 1000 includes applying the torque limit selected at 1012 to the driver demand for torque (e.g., offsetting or canceling any additional demand for torque above the torque limit). As a result of applying the torque limit selected at 1012, the requested torque is applied up to the selected torque limit, and torque requested in excess of the selected torque limit is not applied. In other words, the requested torque that is applied (up to the limit) is the adjusted torque as adjusted by the driver demand adjustment described with respect to FIG. 9.

Thus, an example method is provided for generating an assistive action to a vehicle traveling behind a target lead vehicle, based on a following distance of the vehicle. If the following distance is less than a first threshold following distance, a first driver demand adjustment may be made to a driver demand for torque, where a commanded acceleration of the vehicle is reduced in accordance with a tailgate transfer function. The first driver demand adjustment may be weighted or further modified, for example, depending on factors including a closing rate of the vehicle, an amount of power in a battery of the vehicle, and/or a slipstream effect generated by the target lead vehicle. If the following distance is less than a second threshold following distance, a second driver demand adjustment may be made to the driver demand for torque, where a torque limit is applied to the driver demand for torque. The torque limit may be based on the following distance, the closing rate of the vehicle, the driver demand, or an absolute torque limit may be applied based on a mode of the vehicle. As a result of generating the assistive action, a mapping from a driver demand to a wheel torque of the vehicle is adjusted to increase a perceived resistance as the following distance decreases.

In this way, while operating the vehicle within the first and/or second threshold following distances, a desired acceleration of the driver may be reduced to increase the following distance. An additional benefit of the systems and methods described herein is that the first and second threshold following distances may be adjusted dynamically based on road conditions, weather conditions, driver performance, driver experience, and other factors. By increasing the following distance, a probability of an impact with the target lead vehicle may be reduced.

The technical effect of providing the assistive action is that while a vehicle is operating within a threshold following distance, a driver demand for torque is reduced, thereby increasing the following distance.

The disclosure also provides support for a method for a vehicle, comprising: operating the vehicle manually behind a target lead vehicle on a road, including estimating a following distance between the vehicle and the target lead vehicle, and responsive to the following distance being less than a first threshold following distance, providing an assistive action by adjusting a mapping from a driver demand to a wheel torque of the vehicle to increase a perceived resistance of the vehicle to the driver demand as the following distance decreases. In a first example of the method, operating the vehicle manually includes adjusting a velocity of the vehicle responsive to an accelerator pedal position as input by the driver. In a second example of the method, optionally including the first example, the mapping is adjusted via a first driver demand adjustment, where a nonlinear tailgate resist transfer function is applied to the driver demand to generate the wheel torque. In a third example of the method, optionally including the first and second examples, the first driver demand adjustment is further adjusted by multiplying the first driver demand adjustment by a transition factor. In a fourth example of the method, optionally including the first through third examples, the first driver demand adjustment is further adjusted by applying a closing rate modification to the first driver demand adjustment, the closing rate modification based on an estimated rate of change of the following distance of the vehicle. In a fifth example of the method, optionally including the first through fourth examples, the first driver demand adjustment is further adjusted by applying an energy modification to the first driver demand adjustment, the energy modification based on a kinetic energy of the vehicle. In a sixth example of the method, optionally including the first through fifth examples, the first driver demand adjustment is further adjusted by applying a slipstream modification to the first driver demand adjustment, the slipstream modification based on a resistance of an air flow around the vehicle. In a seventh example of the method, optionally including the first through sixth examples, the first driver demand adjustment is adjusted by applying one or more of a transition factor, a closing rate modification to the first driver demand adjustment, the closing rate modification based on an estimated rate of change of the following distance of the vehicle, an energy modification to the first driver demand adjustment, the energy modification based on an amount of energy in a battery of the vehicle, and a slipstream modification to the first driver demand adjustment, the slipstream modification based on a resistance of an air flow around the vehicle. In an eighth example of the method, optionally including the first through seventh examples, the method further comprises: responsive to the following distance being less than a second threshold following distance, the second threshold following distance less than the first threshold following distance, further adjusting the mapping via a second driver demand adjustment, which includes applying a torque limit to the driver demand for torque, the torque limit based on one of the following distance, an estimated closing rate comprising an estimated rate of change of the following distance, the driver demand for torque, or a mode-based absolute torque of the vehicle. In a ninth example of the method, optionally including the first through eighth examples, the torque limit is the lesser of a closing rate-based torque limit, a following distance-based torque limit, a driver demand-based torque limit, and a mode-based absolute torque limit of the vehicle. In a tenth example of the method, optionally including the first through ninth examples, the method further comprises, responsive to at least one of the first driver demand adjustment being applied to the driver demand for torque and the second driver demand adjustment being applied to the driver demand for torque, adjusting an amount of fuel delivered to an engine of the vehicle to deliver the adjusted driver demand for torque. In an eleventh example of the method, optionally including the first through tenth examples, the tailgate resist transfer function is a nonlinear function that increases the perceived resistance of the vehicle to the driver demand for torque up to a threshold accelerator pedal position, and decreases the perceived resistance of the vehicle to the driver demand for torque to zero as an accelerator pedal position increases from the threshold accelerator pedal position to a maximum pedal position. In a twelfth example of the method, optionally including the first through eleventh examples, the following distance is greater than the first threshold following distance, and the assistive action is not applied to the driver demand for torque. In a thirteenth example of the method, optionally including the first through twelfth examples, the method further comprises: calculating the first threshold following distance and the second threshold following distance based on at least one of a velocity of the vehicle, a condition of the road, a condition of an environment in which the vehicle is operating, and driver data.

The disclosure also provides support for a system for controlling an engine of a vehicle, comprising: a proximity sensing system, including one or more external front-end sensors installed on a front end of the vehicle, a controller with computer readable instructions stored on non-transitory memory that when executed during operation of the vehicle, cause the controller to detect a target lead vehicle traveling ahead of the vehicle on a road in a direction of the vehicle via the one or more external front-end sensors, estimate a following distance between the vehicle and the target lead vehicle via the proximity sensing system of the vehicle, estimate a velocity of the vehicle via one or more sensors of the vehicle, based on the following distance and the velocity of the vehicle, calculate a first threshold following distance and a second threshold following distance, responsive to a driver demand for torque based on a pedal position of an accelerator pedal of the vehicle, the following distance being within the first threshold following distance, calculate and apply a first driver demand adjustment to the driver demand for torque, responsive to the driver demand for torque based on the pedal position of the accelerator pedal of the vehicle, the following distance being within the second threshold following distance, calculate and apply a second driver demand adjustment to the driver demand for torque, and adjust an amount of fuel delivered to the engine to deliver a final driver demand for torque, the final driver demand for torque a result of applying at least one of the first driver demand adjustment and the second driver demand adjustment to the driver demand for torque. In a first example of the system, calculating the first threshold following distance and the second threshold following distance further comprises at least one of receiving road condition data from the one or more external front-end sensors installed on a front end of the vehicle, receiving environmental condition data from the one or more external front-end sensors installed on a front end of the vehicle, receiving current driver performance data from the one or more external front-end sensors installed on a front end of the vehicle, receiving historical driver performance data from a driver database of the vehicle, receiving driver facial image data from one or more in-cabin sensors of the vehicle, and adjusting the first threshold following distance and the second threshold following distance based on at least one of the road condition data, the environmental condition data, the current driver performance data, the historical driver performance data, and/or the driver facial image data. In a second example of the system, optionally including the first example, calculating and applying the first driver demand adjustment to the driver demand for torque includes applying a tailgate resist transfer function to the driver demand for torque to generate an adjusted driver demand, and one or more of multiplying the adjusted driver demand by a transition factor, reducing the adjusted driver demand based on a closing rate of the vehicle, where the closing rate is a rate of decrease of the following distance over time, reducing the adjusted driver demand based on a kinetic energy of the vehicle, and reducing the adjusted driver demand based on an amount of slipstream air resistance of the vehicle, where the slipstream air resistance is based on a flow of air around the vehicle caused by the target lead vehicle. In a third example of the system, optionally including the first and second examples, calculating and applying the second driver demand adjustment includes calculating a closing rate-based torque limit of the vehicle, calculating a following distance-based torque limit of the vehicle, calculating a driver demand-based torque limit of the vehicle, calculating a mode-based absolute torque limit of the vehicle, and applying the lesser of the closing rate-based torque limit, the following distance-based torque limit, the driver demand-based torque limit, and the mode-based absolute torque limit to the first driver demand adjustment to generate the second driver demand adjustment.

The disclosure also provides support for a method for a vehicle, comprising, in a first condition, with the vehicle following a target lead vehicle at a first following distance that is greater than a first threshold following distance, delivering wheel torque according to a driver demand for torque that is not adjusted based on the first following distance, determining that the vehicle is operating in a second condition including the vehicle following the target lead vehicle at a second following distance that is less than the first threshold following distance and less than a second threshold following distance, and in response, adjusting the driver demand for torque via a first driver demand adjustment based on the second following distance, and determining that the vehicle is operating in a third condition including the vehicle following the target lead vehicle at a third following distance that is less than the first threshold following distance and greater than the second threshold following distance, and in response, adjusting the driver demand for torque via the first driver demand adjustment modified via a transition factor. In a first example of the method, adjusting the driver demand for torque via the first driver demand adjustment includes adjusting a mapping from a driver demand for torque to a wheel torque of the vehicle to increase a perceived resistance of the vehicle to the driver demand for torque as the following distance decreases, by applying a tailgate resist transfer function. In a second example of the method, optionally including the first example, applying the tailgate resist transfer function includes adjusting the driver demand as a function of one or more of a rate of change of the following distance, the driver demand, an amount of kinetic energy of the vehicle, and an air resistance of the vehicle. In a third example of the method, optionally including the first and second examples, the tailgate resist transfer function is a nonlinear function that increases a perceived resistance of the vehicle to the driver demand during a first increase of an accelerator pedal position, and decreases the perceived resistance of the vehicle to the driver demand for torque during a second increase of the accelerator pedal position. In a fourth example of the method, optionally including the first through third examples, adjusting the driver demand for torque via the second driver demand adjustment includes increasing a perceived resistance of the vehicle to the driver demand by applying a torque limit to the driver demand based on at least one of the following distance, a rate of change of the following distance, the driver demand, or an absolute torque limit.

Note that the example control and estimation routines included herein may be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, the vehicle including a brake pedal and an accelerator pedal, the method comprising:
operating, responsive to a depression of the accelerator pedal, the vehicle manually behind a target lead vehicle on a road with positive wheel torque applied via a mapping from a driver demand for torque requested via the accelerator pedal to a wheel torque of the vehicle, including estimating a following distance between the vehicle and the target lead vehicle, and responsive to the following distance being less than a first threshold following distance, providing an assistive action during the manual operation by adjusting the mapping to increase a perceived resistance of the vehicle to the driver demand as the following distance decreases while continuing to apply positive wheel torque.

2. The method of claim 1, further comprising calculating the first threshold following distance at least partially based on at least one of road condition data, historical driver data, and driver performance data, and wherein providing the assistive action includes adjusting a velocity of the vehicle responsive to the accelerator pedal position as input by the driver.

3. The method of claim 1, wherein the mapping is adjusted via a first driver demand adjustment, where a nonlinear tailgate resist transfer function is applied to the driver demand to generate the positive wheel torque until the transfer function reduces wheel torque to zero, and then applying wheel brakes.

4. The method of claim 3, wherein the first driver demand adjustment is further adjusted by multiplying the first driver demand adjustment by a transition factor.

5. The method of claim 3, wherein the first driver demand adjustment is further adjusted by applying a closing rate modification to the first driver demand adjustment, the closing rate modification based on an estimated rate of change of the following distance of the vehicle.

6. The method of claim 3, wherein the first driver demand adjustment is further adjusted by applying an energy modification to the first driver demand adjustment, the energy modification based on a kinetic energy of the vehicle.

7. The method of claim 3, wherein the first driver demand adjustment is further adjusted by applying a slipstream modification to the first driver demand adjustment, the slipstream modification based on a resistance of an air flow around the vehicle.

8. The method of claim 3, wherein the first driver demand adjustment is adjusted by applying one or more of:
   a transition factor;
   a closing rate modification to the first driver demand adjustment, the closing rate modification based on an estimated rate of change of the following distance of the vehicle;
   an energy modification to the first driver demand adjustment, the energy modification based on an amount of energy in a battery of the vehicle; and
   a slipstream modification to the first driver demand adjustment, the slipstream modification based on a resistance of an air flow around the vehicle.

9. The method of claim 3, further comprising, responsive to the following distance being less than a second threshold following distance, the second threshold following distance less than the first threshold following distance, further adjusting the mapping via a second driver demand adjustment, which includes applying a torque limit to the driver demand for torque, the torque limit based on one of the following distance, an estimated closing rate comprising an estimated rate of change of the following distance, the driver demand for torque, or a mode-based absolute torque of the vehicle.

10. The method of claim 9, wherein the torque limit is the lesser of a closing rate-based torque limit, a following distance-based torque limit, a driver demand-based torque limit, and a mode-based absolute torque limit of the vehicle.

11. The method of claim 9, further comprising:
    responsive to at least one of the first driver demand adjustment being applied to the driver demand for torque and the second driver demand adjustment being applied to the driver demand for torque, adjusting an amount of fuel delivered to an engine of the vehicle to deliver the adjusted driver demand for torque.

12. The method of claim 3, wherein the tailgate resist transfer function is a nonlinear function that increases the perceived resistance of the vehicle to the driver demand for torque up to a threshold accelerator pedal position, and decreases the perceived resistance of the vehicle to the driver demand for torque to zero as a position of the accelerator pedal increases from the threshold accelerator pedal position to a maximum pedal position.

13. The method of claim 1, wherein the following distance is greater than the first threshold following distance, and the assistive action is not applied to the driver demand for torque.

14. A system for controlling an engine of a vehicle, comprising:
    a proximity sensing system, including one or more external front-end sensors installed on a front end of the vehicle;
    a controller with computer readable instructions stored on non-transitory memory that when executed during operation of the vehicle, cause the controller to:
        detect a target lead vehicle travelling ahead of the vehicle on a road in a direction of the vehicle via the one or more external front-end sensors;
        estimate a following distance between the vehicle and the target lead vehicle via the proximity sensing system of the vehicle;
        estimate a velocity of the vehicle via one or more sensors of the vehicle;
        based on the following distance and the velocity of the vehicle, calculate a first threshold following distance and a second threshold following distance;
        responsive to a driver demand for torque based on a pedal position of an accelerator pedal of the vehicle, the following distance being within the first threshold following distance, calculate and apply a first driver demand adjustment to the driver demand for torque;
        responsive to the driver demand for torque based on the pedal position of the accelerator pedal of the vehicle, the following distance being within the second threshold following distance, calculate and apply a second driver demand adjustment to the driver demand for torque; and
        adjust an amount of fuel delivered to the engine to deliver a final driver demand for torque, the final driver demand for torque a result of applying at least one of the first driver demand adjustment and the second driver demand adjustment to the driver demand for torque.

15. The system of claim 14, wherein calculating and applying the first driver demand adjustment to the driver demand for torque includes:
    applying a tailgate resist transfer function to the driver demand for torque to generate an adjusted driver demand; and one or more of:
    multiplying the adjusted driver demand by a transition factor;
    reducing the adjusted driver demand based on a closing rate of the vehicle, where the closing rate is a rate of decrease of the following distance over time;
    reducing the adjusted driver demand based on a kinetic energy of the vehicle; and
    reducing the adjusted driver demand based on an amount of slipstream air resistance of the vehicle, where the slipstream air resistance is based on a flow of air around the vehicle caused by the target lead vehicle.

16. The system of claim 14, wherein calculating and applying the second driver demand adjustment includes:
    calculating a closing rate-based torque limit of the vehicle;
    calculating a following distance-based torque limit of the vehicle;
    calculating a driver demand-based torque limit of the vehicle;
    calculating a mode-based absolute torque limit of the vehicle; and
    applying the lesser of the closing rate-based torque limit, the following distance-based torque limit, the driver demand-based torque limit, and the mode-based absolute torque limit to the first driver demand adjustment to generate the second driver demand adjustment.

17. A method for a vehicle including an accelerator pedal and a brake pedal, the method comprising:
    in a first condition, with the vehicle being operated manually behind a target lead vehicle at a first following distance that is greater than a first threshold following distance, delivering wheel torque according to a driver demand for torque requested via a depression of the accelerator pedal, the delivered wheel torque not adjusted based on the first following distance;
    determining that the vehicle is operating in a second condition including the vehicle being operated manually behind the target lead vehicle at a second following distance that is less than the first threshold following distance and less than a second threshold following distance, and in response, adjusting the driver demand for torque requested via a depression of the accelerator pedal during the manual operation via a first driver demand adjustment based on the second following distance while continuing to apply positive wheel torque; and determining that the vehicle is operating in a third condition including the vehicle being operated manually behind the target lead vehicle at a third following distance that is less than the first threshold following distance and greater than the second threshold following distance, and in response, adjusting the driver demand for torque requested via a depression of the accelerator pedal during the manual operation via the first driver demand adjustment modified via a transition factor, while continuing to apply positive wheel torque.

18. The method of claim 17, wherein adjusting the driver demand for torque via the first driver demand adjustment includes adjusting a mapping from a driver demand for torque to a wheel torque of the vehicle to increase a perceived resistance of the vehicle to the driver demand for torque as the following distance decreases, by applying a tailgate resist transfer function.

19. The method of claim 18, wherein applying the tailgate resist transfer function includes adjusting the driver demand as a function of one or more of a rate of change of the following distance, the driver demand, an amount of kinetic energy of the vehicle, and an air resistance of the vehicle.

20. The method of claim 17, wherein adjusting the driver demand for torque via the second driver demand adjustment includes increasing a perceived resistance of the vehicle to the driver demand by applying a torque limit to the driver demand based on at least one of the following distance, a rate of change of the following distance, the driver demand, or an absolute torque limit.

* * * * *